US005530894A

United States Patent [19]
Farrell et al.

[11] Patent Number: 5,530,894
[45] Date of Patent: Jun. 25, 1996

[54] ADAPTER FOR INTERFACING A COMPUTER TO A MULTICHANNEL DIGITAL NETWORK, WITH PORT FOR A TELEPHONE

[75] Inventors: Joseph K. Farrell, Boca Raton, Fla.; Jeffrey S. Gordon, Centreville, Va.; Robert V. Jenness, Boca Raton, Fla.; Daniel C. Kuhl, Delray Beach, Fla.; Timothy V. Lee, Boca Raton, Fla.; Tony E. Parker, Boca Raton, Fla.

[73] Assignee: International Business Machines Corporation, Armonk, N.Y.

[21] Appl. No.: 432,999

[22] Filed: May 2, 1995

Related U.S. Application Data

[63] Continuation of Ser. No. 208,500, Mar. 9, 1994, abandoned, which is a continuation of Ser. No. 744,841, Aug. 12, 1991, abandoned.

[51] Int. Cl.⁶ ................................................. G06F 13/00
[52] U.S. Cl. ........................ 395/800; 364/DIG. 1; 364/238; 364/238.2; 364/238.5
[58] Field of Search ................................. 395/800, 200, 395/275, 725, 425; 370/77, 91, 95.3, 95 A, 100.1, 109, 112, 58, 60

[56] References Cited

U.S. PATENT DOCUMENTS

| | | | |
|---|---|---|---|
| 4,730,312 | 3/1988 | Johnson et al. | 370/110.1 |
| 4,839,802 | 6/1989 | Wonak et al. | 395/275 |
| 4,866,703 | 9/1989 | Black et al. | 370/60 |
| 4,893,326 | 1/1990 | Duran et al. | 379/96 |
| 4,907,225 | 3/1990 | Gulick et al. | 370/94.1 |
| 4,922,490 | 5/1990 | Blakley | 370/110.1 |
| 4,965,796 | 10/1990 | Petty | 370/112 |
| 4,974,192 | 11/1990 | Face et al. | 395/275 |
| 4,974,254 | 11/1990 | Perine et al. | 379/100 |
| 4,996,685 | 2/1991 | Farese et al. | 370/110.1 |
| 5,051,992 | 9/1991 | Taniguchi et al. | 370/110.1 |
| 5,062,103 | 10/1991 | Davidson et al. | 370/110.1 |
| 5,070,524 | 12/1991 | Mano | 379/165 |
| 5,117,452 | 5/1992 | Callele et al. | 379/98 |
| 5,134,611 | 7/1992 | Steinka et al. | 370/79 |
| 5,164,982 | 11/1992 | Davis | 379/96 |
| 5,199,062 | 3/1993 | Von Meister et al. | 379/67 |
| 5,204,949 | 4/1993 | Yasue et al. | 395/200 |
| 5,267,245 | 11/1993 | Maruyama et al. | 370/109 |

OTHER PUBLICATIONS

Thomas Illies, "ISDN Downward Compatible with Modular PC–Card", Funkschau, No. 6, Mar. 8, 1991, pp. 89–92.
"Experience Report on ISDN Terminal Devices: PC as convenience Telephone and More", Funkschau, No. 26, Dec. 15, 1989, pp. 29, 32, 34.
Yoichi Isokawa et al, "Aterm 100/Aterm 200 For Use with INS–MET 64" NEC Technical Journal, vol. 42, No. 3, 1989 pp. 50–53.

Primary Examiner—Mehmet Geckil
Attorney, Agent, or Firm—Anthony N. Magistrale

[57] ABSTRACT

Disclosed is an arrangement for "seamlessly" integrating telephone services relative to primitive analog telephone equipment into general purpose computer systems. The integration is effected through present "secondary" adaptation of data link control adapter devices which are adapted primarily for coupling such computer systems to high speed data communication links for transmission and reception of digital data. This permits general resources of the computer system (keyboard, memory, disk drives, etc.) to be used for specific applications associated with telephone services. Presently described link control devices have a telephone attachment port which couples through analog-to-digital conversion circuits to a primitive analog telephone (no dial or keys). Such devices operate normally in time division multiplex to process communication data between a computer (host) system and data link ports. The present adaptation includes a host programmable time division switch circuit within the control device, which can be conditioned dynamically to route digitized telephone signals directly between its data link and telephone ports, whereby telephone signals can be transmitted isochronally between a local user of the host system and a remote telephone, over a telephone network connection, while data signals are being transferred in either direction between the host system and equipment at the remote telephone station over the same connection.

11 Claims, 13 Drawing Sheets

| Port | Channels Rcv | Xmit |
|---|---|---|
| 1 | B11/r | B11/t |
| 1 | B12/r | B12/t |
| 1 | D1/r | D1/t |
| 2A | B21/r | B21/t |
| 2A | B22/r | B22/t |
| 2A | D2/r | D2/t |
| 2B | P/r | P/t |

Figure 7
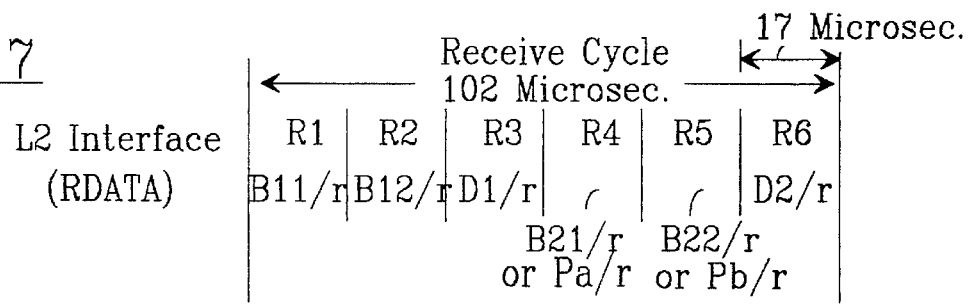
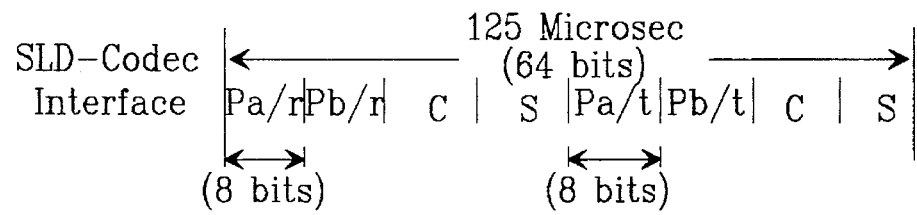
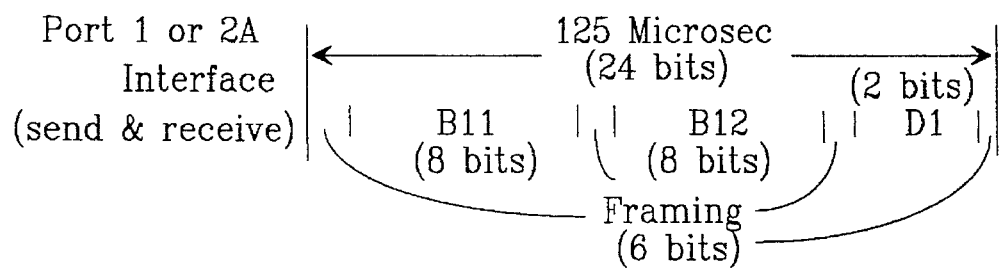

Figure 8 (BRIM1)

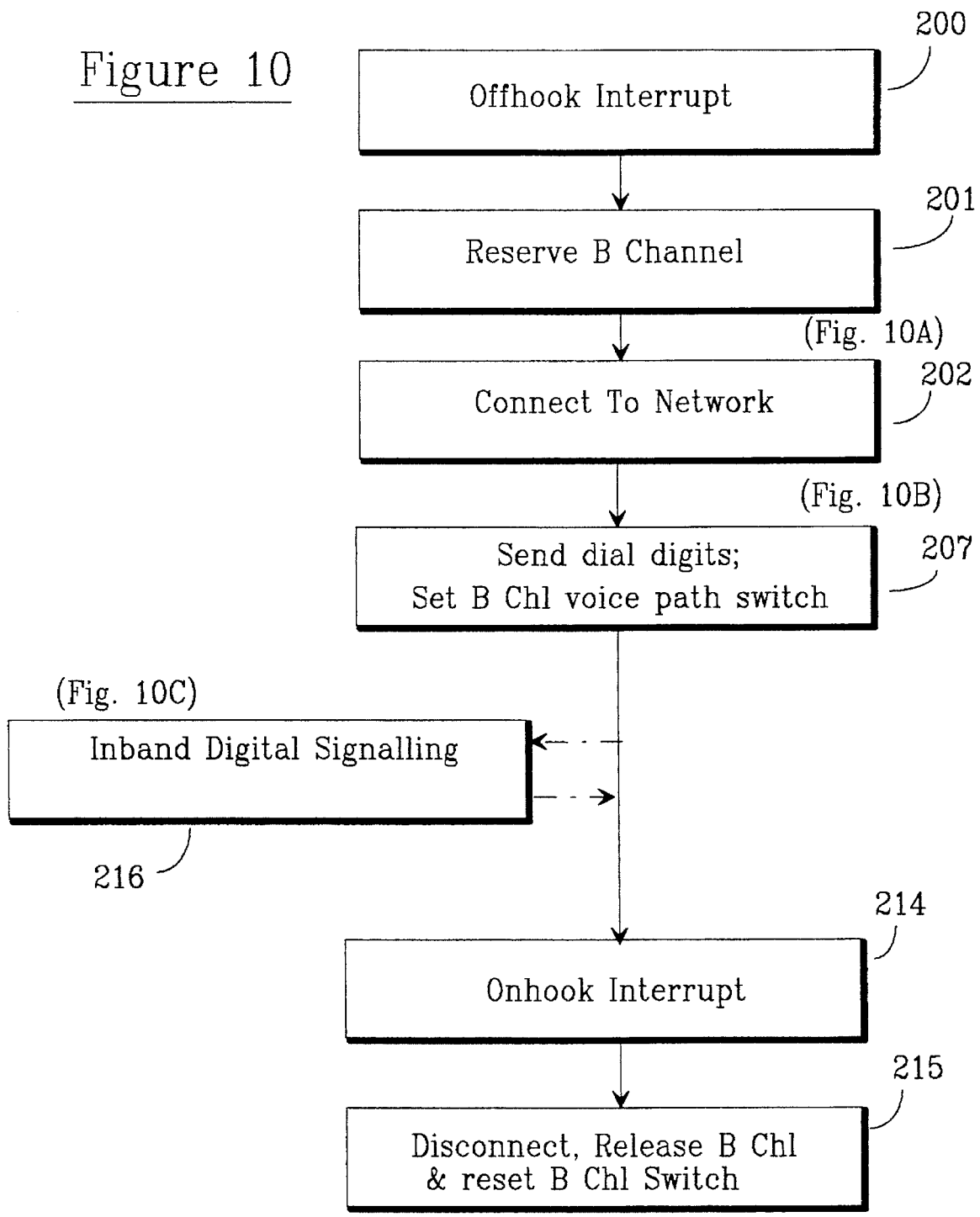

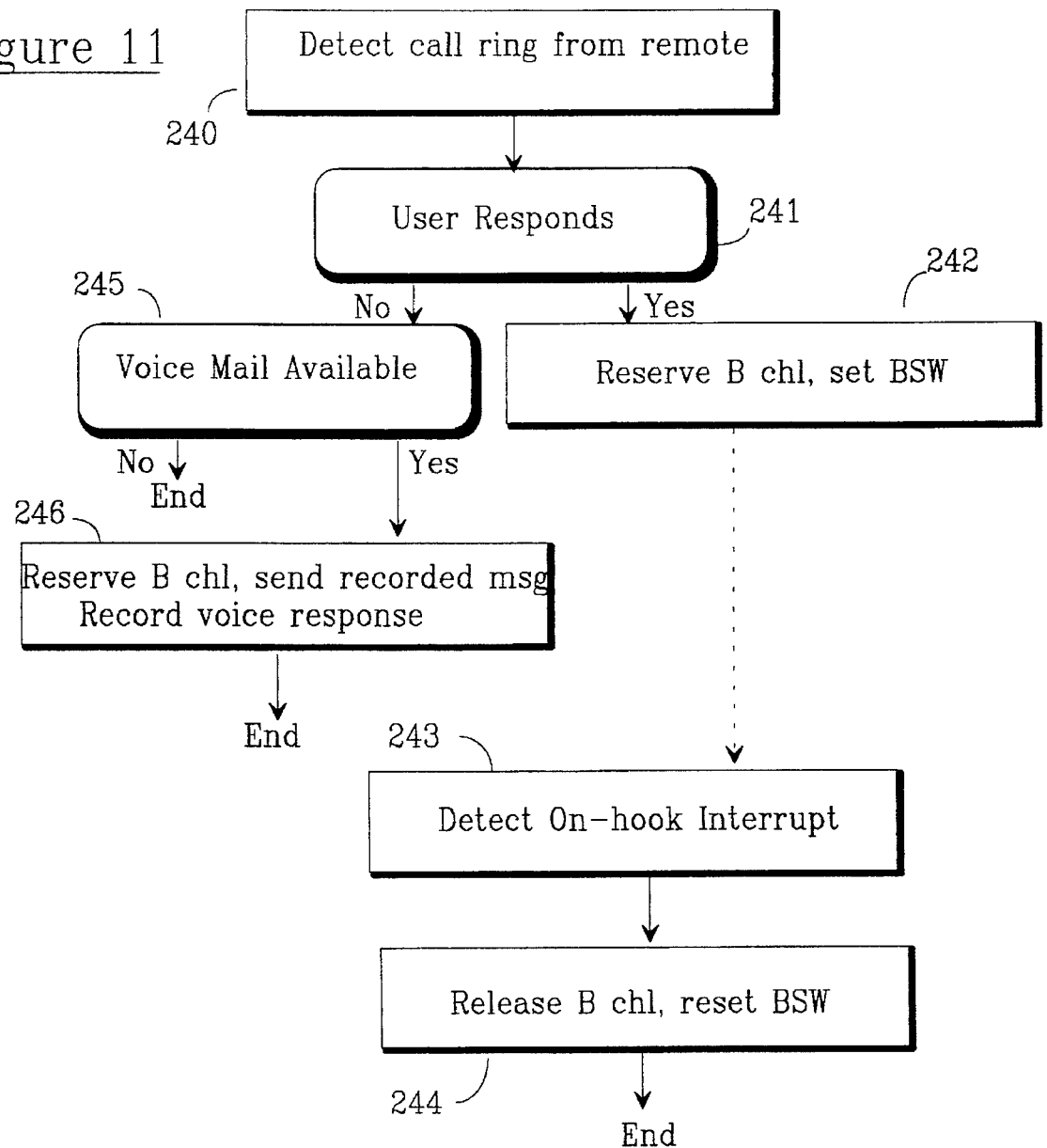

ADAPTER FOR INTERFACING A COMPUTER TO A MULTICHANNEL DIGITAL NETWORK, WITH PORT FOR A TELEPHONE

This is a continuation of application Ser. No. 08/208,500 filed Mar 9, 1994 now abandoned which is a continuation of application Ser. No. 07/744,841 filed Aug. 12, 1991 now abandoned.

FIELD OF THE INVENTION

This invention relates to communication adapter devices for computer systems.

RELATED PATENT APPLICATIONS

1. U.S. patent application Ser. No. 07/495,232 by J. K. Farrell et al, filed Mar 15, 1990, entitled "Integrated Data Link Controller With Autonomous Logical Elements".

2. U.S. patent application Ser. No. 07/495,810 by J. K. Farrell et al, filed Mar 15, 1990, entitled "Integrated Data Link Controller With Synchronous Link Interface And Asynchronous Host Processor Interface".

3. U.S. patent application Ser. No. 07/495,012 by J. K. Farrell et al, filed Mar 15, 1990, entitled "Burst Time Division Multiplex Interface For Integrated Data Link Controller".

4. U.S. patent application Ser. No. 07/614,524, by J. K. Farrell et al, filed Nov. 16, 1990, entitled "Direct Memory Access Controller With Adaptive Pipelining".

The foregoing patent applications, all assigned to the assignee of the present application and presently co-pending, describe logical aspects of a data link control device which provides a number of "second layer" (L2) data link functions useful for ISDN (Integrated Systems Digital Network) applications. The L2 functions are different from "layer 1" (L1) functions which control the actual transmission and reception of signals at external link interfaces.

Connecting between a ("host") computer system and plural data communication links, the device described in these applications attaches to and is directly programmed by the host system. The device operates in time multiplex, relative to multiple external communication channels, to establish link connections with remote devices and sustain data signalling processes between the remote devices and the host system. Upon being initiated relative to an external channel (by the host system), the device proceeds to operate in a manner which is "transparent" to the host system CPU (central processing unit). In these operations, the device conveys data signals between an external link and a memory subsystem of the host system, while evaluating and selectively modifying certain types of data signals.

Operations of the device relative to external channels are performed in time multiplex, in time coordination with associated external signalling processes. Operations relative to host memory are performed via a direct memory access (DMA) controller circuit integrated in the device. Externally received and transmitted data signals are processed by the device in separate L2 receive and transmit circuit partitions. Relative to any external channel being served in full duplex mode, these partitions operate concurrently to process data signals being received from and transmitted to that channel.

The receive partitions act to: receive data bit-serially from L1 circuits, assemble and buffer the data in byte units, remove certain signal fields from data formatted in a special protocol such as HDLC (redundancy bits, control characters, and check fields), perform error and destination address check functions when appropriate, store received data in an internal RAM buffer (FIFOR) from which the data is transferred subsequently to host system memory, and signal requests to coordinate DMA transfers of data from FIFOR to host memory (in byte or word parallel units).

The transmit partitions: signal requests to coordinate DMA transfers of data (bytes or words) from host memory to FIFOR, as required to sustain continuous transmission of data externally, insert special fields into data arranged in certain protocols such as HDLC (e.g. control flags, error check fields, and redundancy bits), convert the data to bit serial form, and pass the data bit-serially to L1 circuits for external transmission.

In synchronism with operations of the receive and transmit partitions, a separate interrupt partition (INT) manages collection of status information (device status and status of reception and transmission processes relative to individual external channels), and coordinates transfer of such information to the host system via interruption requests. INT stores collected status information in another internal RAM buffer of the device, until the information is retrieved by the host system.

A separate direct memory access control (DMAC) partition acts relative to FIFOR and a host computer system bus to manage transfers of data (bidirectionally) between FIFOR and host system memory. Operations of DMAC relative to signals being transferred to and from host memory are asynchronous in relation to associated external channel signalling processes.

Applications 1 and 2 above describe organizational and architectural details of an embodiment of this device named the Integrated Data Link Controller (IDLC). Application 3 describes a special Burst Time Division Multiplex (BTDM) interface between the IDLC and associated L1 circuits. Application 4 describes the general architecture of a device similar to the IDLC, which is Galled an Integrated ISDN Module (IIM), and specific enhancements of the DMAC partition contained in that device.

The IIM is functionally similar to the IDLC, but has reduced link channel capacity, and contains several features not found in the IDLC; including the above-mentioned enhanced DMAC partition, integral L1 circuits, and certain other elements unique to the present invention.

BACKGROUND OF THE INVENTION

The foregoing data link control devices provide advanced levels of connectivity and functionality between computer systems and communication networks; particularly, networks operating under Integrated Services Digital Network (ISDN) protocols as defined in existing international standards (refer to Integrated Services Digital Network (ISDN), Recommendations of the Series I, CCITT VIIIth Plenary Assembly, Geneva 1985, and particularly to Volume III, Fascicle III.5 of that proceeding (hereafter cited as ISDN Fascicle 111.5).

Such networks are designed to be able to sustain transmission of digital data signals, and voice grade digital telephone signals, at bit rates beyond capabilities of many of today's analog telephone networks. Data links on such networks generally sustain groups of "nB+D" serial data communication channels (refer to ISDN Fascicle III.5, recommendation 1.412, section 3), and adapter (link control) devices operating between such links and computer systems or devices (host systems) must support communications relative to such channels. The devices described in the cross-referenced patent applications above, also perform additional functions mentioned above (insertion/deletion of characters, check functions, etc) to relieve the host system of corresponding functional burdens.

The IDLC device described in cross-referenced applications 1–3 is designed to sustain communication relative to a "30B+D" channel group (30 B channels and one D channel). The IIM device described in application 4 above is designed to sustain communication relative to either one or two groups of "2B+D" channels (two B channels and one D channel in each group). The IIM also can perform certain functions relative to telephone networks which were not contemplated for the IDLC. These functions and associated circuits and applications are subjects of the present invention.

What is considered innovational presently is a recognition that a need exists for "seamless" integration of certain telephone services into today's desktop and mid-size computer systems, and that a "serendipitous" focal point of such integration is in the communications adaption path between the system and data communication links. The convenience or serendipity of this choice of focus will be understood as this disclosure proceeds.

The enhanced IIM device described herein provides a basis for seamless integration of many telephone related services into computer systems. It contains a telephone attachment port, data link ports and circuits for transferring data signals selectively either between memory in a host computer system and any channel (B, or D) on its data link ports or "directly" between the telephone port and one of the B channels on a data link port. To a user of a host computer system, a telephone attached to the device's telephone port, appears to be an integral extension of the system, while imposing relatively small processing and I/O contention burdens on central resources of the system shared by other devices (memory, bus, system CPU, etc.).

A problem in attaching telephones to computer systems, is that voice grade telephone signals associated with real-time telephone conversations must not be degraded by excessive or unpredictable delays. Consequently, it is recognized presently that such signals must not be routed through computer system resources which are shared by other devices (e.g. system I/O bus and memory); since contention for such resources could introduce delays which may degrade transferred voice signals in an unacceptable manner. As adapted presently, the IIM provides isochronal handling of real time voice signals which meets this requirement.

OBJECTS OF THE INVENTION

An object of this invention is to provide an improved arrangement for providing voice telephone services to users of computer systems.

Another object is to provide an improved arrangement for providing voice telephone services to users of computer systems, wherein voice grade signals are not potentially degraded by handling through computer system resources which are shared by plural devices (e.g. "central" resources such as bus, memory, CPU, etc.).

Another object is to provide an improved arrangement for providing voice telephone services to uses of computer systems, which is able to sustain high quality transmission of digitized voice telephone signals and other data signals between an associated computer system station and remote telephone and telecommunication networks.

Another object is to provide an improved arrangement as just characterized, which is able to adaptively transfer digitized voice and data signals between a computer system station and remote telephone network, over an established telephone call connection path in that network, while providing isochronal handling of the voice signals between a telephone attached to the station and remote telephones.

Another object is to provide telephone services to users of a computer system through a data commmunications adapter attached to the system, wherein the adapter can be programmed to provide isochronal transfer of voice grade telephone signals directly between a telephone attached to the adapter and a remote telephone network to which the adapter is coupled, and also to allow for digital data signals to be transferred between a computer system to which the adapter is attached and the same telephone network; whereby enhanced telephone: services can be provided to users of the computer system at minimal cost.

Another object is to provide an improved data link control device, which is useful to transfer data between a computer system and external data communication links and attaches to the computer system through a bus which may be shared by plural other devices, and which is also useful for providing high quality voice telephone services to a user of the computer system which services appear to the system user as being seamlessly integrated into the system but are actually to a great extent carried on within the device.

Another object is to provide a data link control device, for transferring data between a computer system and data communication links, wherein the device can be used as a unique focal point for providing telephone services to users of the computer system, wherein such services include providing a signal transfer path between a telephone and the data links served by the device over which signals representing voice can be transferred isochronally between the telephone and a remote telephone station while data is being transmitted concurrently between the computer system and the remote station.

Another object is to provide a communication data link control device with the foregoing capability, which device is operated both as a data link communication adapter relative to the system and as a connection adapter between a telephone and data links, whereby voice signals can be transmitted between the telephone and data links without being delayed or degraded by handling in other elements of the computer system and whereby data signals can be transmitted between the system and a remote telephone network over a data link path currently sustaining a voice signalling connection between the telephone connected to the device and a remote telephone.

Another object is to provide a data link control device which can provide telephone services to users of personal computer systems, by sharing elements of the system, at a cost less that, would be required to provide such users with the same services separate from the system.

Another object is to provide a data link control device which is useful linking a computer system and a telephone with data links, and via such links with a telephone network, and which in addition is adaptive under control of the computer system to allow for concurrent transmission of voice telephone signals between the telephone and the telephone network and data signals between the computer system and the same network.

Another object is to provide a data link control device programmably controlled by a computer system, for separately coupling the computer system and a telephone device to data communication links, wherein the device can be dynamically controlled by the system to transfer voice grade telephone signals isochronally between the telephone and a remote telephone network over a data link while data signals are being transmitted intermittently between the computer system and the same network over the same link.

A related object is to provide a link control device as just characterized, wherein the device contains special switching circuitry programmably controllable by the computer system for providing interspersed isochronal transmission of voice signals and data signals as just characterized.

Another object is to provide an improved data link control device, with programmable switching circuits as just characterized, wherein the device and a computer system to which it attaches are efficiently operable to provide enhanced telephone services to users of the computer system with minimal cost to the users and minimal processing burden on the computer system with respect to the handling of voice grade telephone signals related to such services.

SUMMARY OF THE INVENTION

In recognition of a present trend towards development of general purpose computers with progressively decreasing cost and increasing functionality, we provide herewith an efficient arrangement for "seamlessly" integrating telephone services into systems built around such computers, whereby general resources of the system (CPU, keyboard, memory, data communication links, etc.) are sharable for providing functions related to telephone services (e.g. call dialing, voice mail handling, etc.) relative to a "minimal" telephone set (transmitter and receiver, but no dial or touch keys). Thus, such services can be provided to a user of the computer system at a cost less than would be needed to provide the same services through a telephone hookup completely separate from the computer system and data communication links.

In realizing such an arrangement, we have modified a data link control device, exemplified by the IIM as disclosed in the cross-referenced application number 4 above, to allow for connecting a telephone directly to an external port of the device and for carrying digitized voice signals isochronally between that telephone and data link ports of the same device.

Thus, a feature of the present invention is that, in addition to its data link ports, the subject device is provided with a telephone port, for connecting a locally accessible telephone to the device, and with internal circuits programmable by a host computer system for selectively transferring data signals between host system memory and data link ports of the device while concurrently being able to transfer voice grade telephone signals between the telephone port and the same data link ports.

These internal circuits include a switch circuit that can be programmed adaptively to transfer voice telephone signals directly between the telephone and data link ports, while allowing data signals to circulate between host system memory and the data link ports; whereby data signals can be transferred through an external channel currently being used for voice communication.

The switch circuit just characterized is configured as a time division switch, so that the device can sustain time multiplex communication between multiple external data link channels and the system while providing signalling connection between the telephone and an external channel.

Together, the host system and the subject device as presently configured can provide enhanced telephone services relative to a minimal telephone set attached to the telephone port (voice transmitter and receiver, but no dial or touch keys). Such services include providing "in-band" digital signals representing tone selection responses to recorded messages transmitted at a remote telephone terminal called by a system user. Most users of today's telephone systems are familiar with being connected to a called number and hearing a recorded message (usually played by a remote voice response unit or VRU) instructing the caller to select between several additional connection functions by pressing designated tone keys. The present arrangement allows the user to respond by actuating an input device of the computer system (keyboard, mouse etc.) to designate the selection, whereupon the system converts the selection to a communication signal which can actuate the remote VRU.

A significant aspect of the switching circuit used in the present arrangement is that it can be configured dynamically to transfer data and voice signals "in-band" over a common telephone network link. Thus, the switch can be configured to be transferring "tone selection signals" from the host system to a remote called station at which a VRU instruction message originated, while at the same time allowing returning voice signals to be heard by the caller at the local telephone set receiver. Hence, if the remote VRU reacts to a locally transmitted signal selection by transmitting a second recorded voice message, with further instructions for a second set of tone selection options, the local caller can immediately hear that voice message while the system is still configured for transmitting additional selection signals to the same call destination. Furthermore, if or when a local origin signal selection results in establishment of connection to a live person, the switch circuitry can be dynamically reconfigured to shunt voice signals bidirectionally between the local caller and that person.

Thus, while operating relative to a data link port sustaining B and D channel communications, a subject device can be dynamically configured to provide isochronal voice signal coupling between a locally attached telephone and a remote telephone, through a B channel and remote telephone network coupled to that channel, while concurrently allowing data to be sent between the local computer system and data receiving equipment through the same B channel and the same telephone network connection path.

Other advantages, benefits and applications of the present invention will be further appreciated and understood by considering the description and claims which follow.

DESCRIPTION OF DRAWINGS

FIG. 7 illustrates the timing of bit transfer operations relative internal registers in the L1/L2 circuit module of FIG. 6 and relative to external interfaces of that module.

FIG. 10 is a flow chart of operations performed by the device of FIG. 2 and host system during local origination of a telephone call.

FIG. 11 illustrates operations performed by the device of FIG. 2 and the associated host system for responding to a remotely originated telephone call.

DETAILED DESCRIPTION OF THE INVENTION

1. INTRODUCTION

Figure 1:
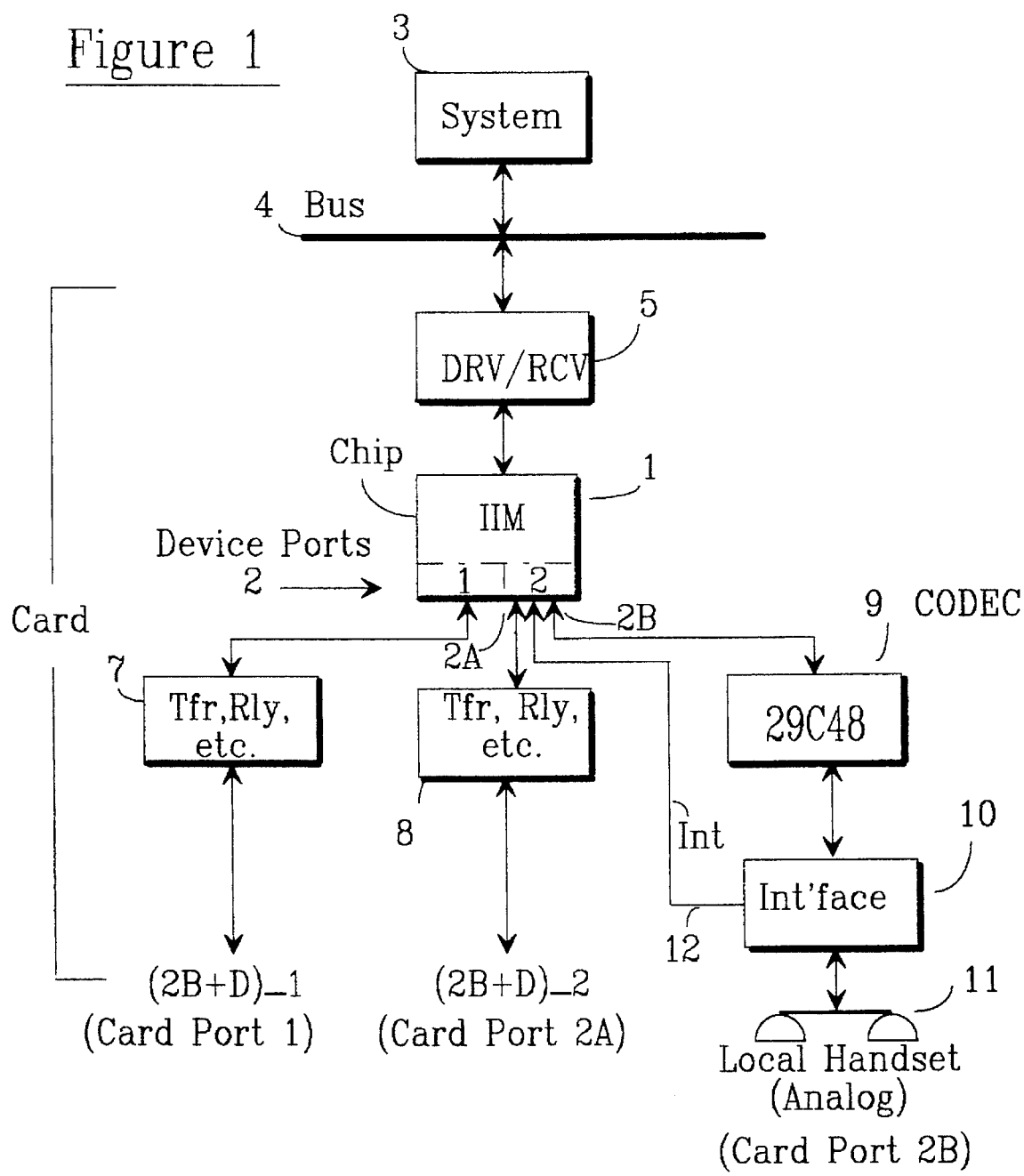
FIG. 1 is a schematic block diagram of a computer system and data link control device configured in accordance with the present invention.

As shown in FIG. 1, data link control device 1 connects between communication ports 2 and "host" computer system 3. Device 1 couples to (not separately shown) CPU and memory elements of system 3, via a bus 4 and driver/receiver circuits indicated generally at 5. Bus 4 is contemplated to be a bus potentially shared by other devices, so that it is understood that device 1 could encounter contention delays in respect to signal transfer operations between it and memory elements of system 3. The significance of this with respect to telephone service operations of device 1 is explained later.

Device 1 is an Integrated ISDN Module (IIM) of a type generally described in cross-referenced application number 4 previously cited. It is initialized programmably by the host computer system, relative to data link channels on its external ports 2, and operates to transfer digital signals representing information between the external channels and host system memory.

Internally, device 1 operates in time multiplex relative to data being transmitted to its ports ("transmit" data) and received from its ports ("receive"data). A cyclically recurrent multiplex time slot is allocated for each channel, and operations relative to receive and transmit data in any active channel are performed in time overlap during recurrences of the respective time slot.

Relative to transmit data in each active channel, this device: manages fetching of (data or voice) information to be communicated from host=memory to an internal buffer memory, in byte or word parallel units, converts the information to bit serial form, inserts special characters and bits into data arranged in certain protocols such as HDLC (e.g. control flags, error check characters, and redundancy bits), directs the bit-serial transmission of the information at its external ports, and notifies the host system of transmit process status in the respective channel via interrupts.

Relative to receive data in any active channel, the device: receives the data bit-serially, converts the information to byte parallel sets, removes control characters, check characters and redundancy bits where appropriate, performs error checking where appropriate, checks address information accompanying data for addressing exceptions where appropriate, and notifies the host system of reception status (receipt of control characters, detected error conditions and/or addressing exceptions, completion, etc.) via interrupts.

Device ports 2 comprise three ports designated Ports 1, 2A and 2B. Port 1 couples to a first data link through adapting circuits 7 (relays, transformers, etc.). On this link, signal communications are sustainable relative to a set of two B channels one D channel (set "(2B+D)_1"). As is well known in the art, D channels are useful to carry control signals for establishing connections between link terminals, and B channels are used for transferring data signals between connected terminals.

Port 2A couples to a second data link through adapting circuits 8 (relays, transformers, etc.), that link supporting communications relative to a second set of two B channels and one D channel; set "(2B+D)_2". Port 2B, which is dedicated for local connection of a telephone set, couples to circuits 9 and 10 which support telephone signalling. Usage of ports 2A and 2B is restricted in a manner such that telephone signals other than hook status indications (off/on hook) are transferable relative to port 2B only when both B channels of port 2B are inactive, and conversely in a manner such that data signals are transferrable relative to either or both B channel of port 2A only when the device is inactive relative to port 2B.

The telephone set 11 contemplated in the illustration is a "primitive" analog handset (no dial or tone signalling keys). Operations for establishing connections between that set and remote telephones are performed by coordinated operations of host system 3, device 1 and a user of system 3, through a keyboard of System 3 (or other input device), in a manner explained later. Circuit 9 is an analog/digital converter (codec), typically an Intel 29C48 chip.

Circuits 10 provide a signal adaption interface between the analog handset and the Codec, in accordance with requirements listed by the Codec manufacturer. Circuits 10 also provide an interrupt signal connection 12 directly to the IIM for indicating offhook and onhook conditions of telephone 11. These indications are communicated to the computer system 3 by the IIM via interrupt signalling.

The IIM is containable on a single semiconductor chip which, together with associated circuits 5 and 7–10, is containable on a single circuit card. In the arrangement presently contemplated, one end of this card attaches to (plugs into) a not-shown I/O bus socket of the system 3, and the opposite end has external connections for card ports 1, 2A and 2B corresponding to the respective device ports mentioned above. Although an analog telephone (handset) device is shown at 11, the IIM is easily adaptable to connect with a digital telephone device or a full-scale ISDN telephone unit.

2. Device Sections

Figure 2:
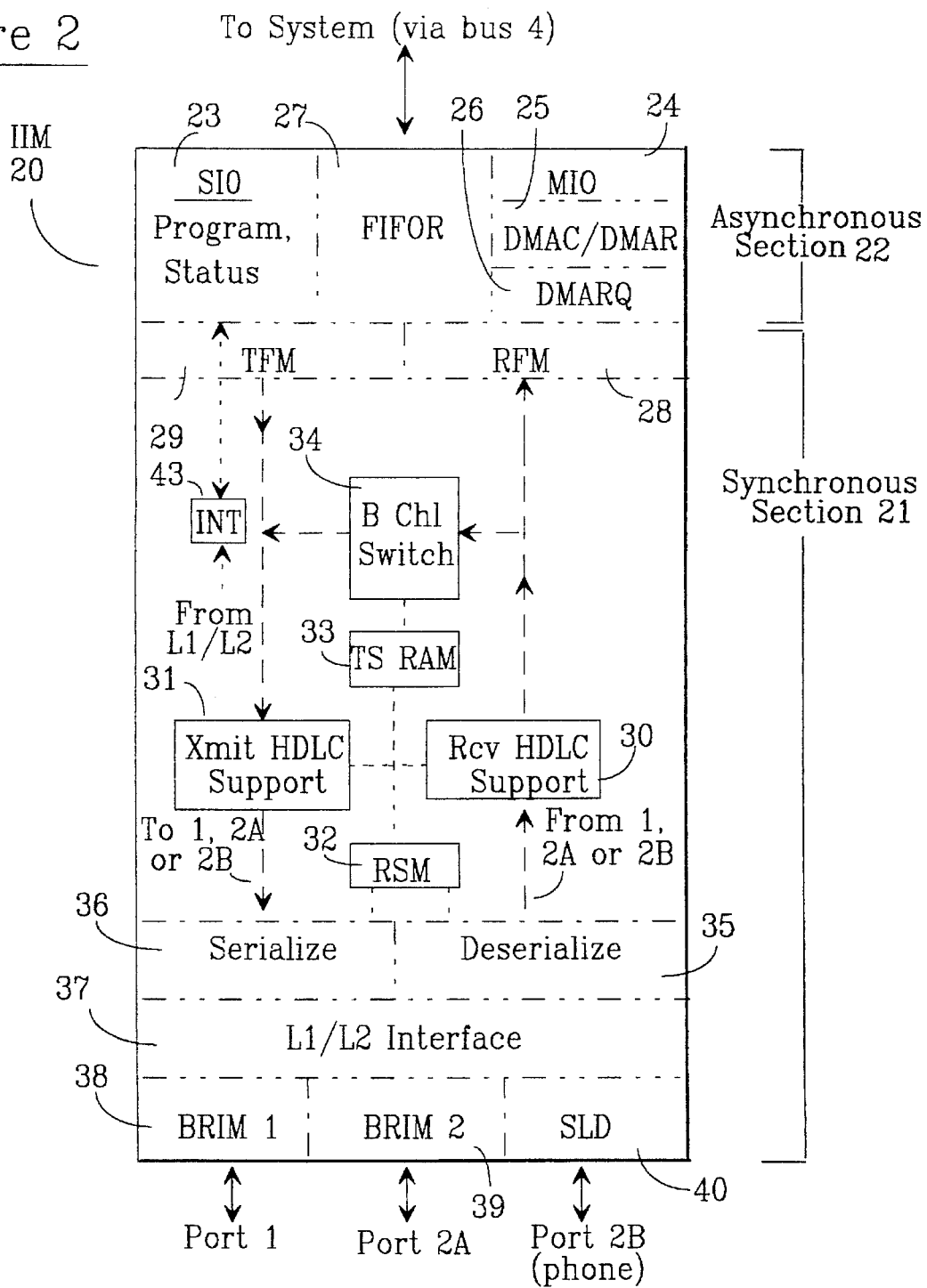
FIG. 2 is a block diagram of a preferred embodiment of the data link control device shown as a block in FIG. 1, illustrating principal circuit partitions of that device in blocks.

Referring to FIG. 2, IIM device 20 of the type presently contemplated comprises a synchronous circuit section 21 and an asynchronous circuit section 22. Synchronous section 21 interfaces between ports at which external signal exchanges occur (1, 2A and 2B) and asynchronous section 22. Section 22 interfaces between section 21 and the host computer system (system 3, FIG. 2) via the latter's bus 4. Of interest presently, are circuits and operations of this device for providing telephone services relative to port 2B, and for allowing the host system to interject certain data signalling operations relative to external links on which telephone signals are being carried. To understand these operations, it is necessary to understand the overall logical structure and operation of sections 21 and 22.

Section 21 operates in synchronism with signal processes at the external ports. Each of the six channels associated with ports 1 and 2A (four B channels and two D channels) is allotted a repetitive multiplex time slot during which circuits in section 21 can process signals being communicated to and from the respective channel. Section 21 is characterized as "synchronous" because its internal processing time slots occur in time coordination with signalling processes at the ports. Section 22 operates in asynchronous relation to the actions of section 21, to sustain signal transfers between processing channels of section 21 and host system memory.

Principal circuit "partitions" in sections 21 and 22 are described next. Implementation details of partitions which are not deemed relevant presently, are disclosed in the above cross-referenced applications 1, 2 and 4. To the extent, if any, that such details could have ancillary relevance presently, their disclosures in said applications are incorporated herein by reference.

Principal partitions of asynchronous section 22 are shown at 23–27 in FIG. 2, and principal partitions of synchronous section 21 are indicated at 28–40 and 43 in the same Figure. Each partition is an autonomous entity in the sense that its operations are fully controlled by circuits such as state machines within the respective partition (in contrast, for example, to circuits which are controlled by a common entity such as a shared microprocessor). Data and control signals are transferred between partitions under control of request and acknowledge signals exchanged by the partitions, in a manner fully described in the above cross-referenced patent applications 1 and 2; but in all other respects operations of each partition are fully controlled by the respective partition.

2.1 Asynchronous Partitions

In both the IDLC and the IIM, an asynchronous "slave I/O" partition (SIO) 23 communicates with the host CPU (via the latter's bus 4) for programming the device and informing the host system of its operational status. Other asynchronous partitions, 24–27, cooperate to transfer signals representing communication data between host system memory and the synchronous section.

During device programming operations, SIO 23 acts as a slave of the host CPU, and provides signal coupling paths between the latter and certain RAM (random access memory) partitions described below, which enable the host system to set up control parameters defining operations to be conducted by the device relative to external channels. In operations for transferring channel process and device status information to the host system, SIO 23 is prompted by INT partition 43 in the synchronous section to present interrupt request signals to the host CPU, and the CPU reacts asynchronously to control SIO to retrieve associated status information from device registers and RAMS's.

INT, which manages the collection, formatting and buffer storage of device and device channel status information, is described in detail in applications 1 and 2 cross-referenced above. To the extent, if any, that details of INT's operations and/or construction could be deemed to have ancillary relevance presently the disclosure of such in these applications is incorporated herein by reference.

Partitions 24–27 cooperate with synchronous partitions 28 and 29 to manage transfers of communication information signals between host system memory and the synchronous section. Partition 27 comprises a FIFO (First In First Out) RAM buffer store designated FIFOR (abbreviation for FIFO RAM). FIFOR contains storage spaces dedicated to each of the six time slots/channels servicable in the synchronous section. Signals representing communication data received by the synchronous section ("receive data") and being transmitted through that section ("transmit data") are transferred into and out of these spaces on a first in first out basis.

Receive data is entered into FIFOR in bit parallel byte sequential form (1 byte=8 bits), and transferred from FIFOR to host memory in word parallel units (1 word=4 bytes). Transmit data is transferred from host memory to FIFOR in word units and passed from FIFOR to the synchronous section in byte units. Synchronous partitions 28 and 29, respectively designated RFM (for "Receive FIFO Manager") and TFM (for "Transmit FIFO Manager"), respectively manage transfers of receive data and transmit data between FIFOR and other synchronous partitions.

"Master I/O"(MIO) partition 24 manages operations required to contend for and control access to the host system bus (bus 4, FIG. 1). "Direct memory access controller" partition (DMAC) 25 cooperates with MIO to control access to host system memory in a direct access (DMA) mode. DMAC operates to define addresses in host system memory and FIFOR between which data (words) are to be transferred. Operations of DMAC and MIO are performed in accordance with program information stored in FIFOR, and in a second RAM memory designated "direct memory access control RAM" (abbreviated DMAR). Although DMAC and DMAR are shown here in one block they are in fact separate logical partitions.

"DMA Request Queue" (DMARQ) partition 26 operates to receive and store control signals provided by RFM 28 and TFM 29, which represent requests for DMAC action relative to FIFOR. DMARQ stores the requests and presents corresponding requests asynchronously to DMAC. In response to the latter requests, DMAC operates to initiate transfers of data between FIFOR and host memory.

Relative to each active receive channel in the synchronous section, RFM enters receive data into FIFOR in byte units, and passes a request to DMARQ as it completes entry of a set of (four) bytes constituting a word unit. DMARQ stores that request, and signals a corresponding request to DMAC. DMAC reacts to the latter request in cooperation with MIO to pass the received word from FIFOR to host memory. In the latter transfer, DMAC controls addressing of both FIFOR and host memory using address information stored in DMAR. After each transfer, DMAC updates/increments the host memory address, information so as to be able to transfer blocks of words from each channel space in FIFOR to host memory.

DMAC also determinaes when a predesignated block of host addresses has been exhausted, and furnishes status information indicating such occurrences to the host system via SIO. Thus, the host system can dynamically prepare a new block of addresses for continuing a receive process.

Relative to each active transmit channel, TFM retrieves transmit data from FIFOR in byte units. As it fetches the last byte of a word unit, TFM passes a request to DMARQ. DMARQ stores that request and present a corresponding (asynchronous) request to DMAC. Thereafter, DMAC cooperates with MIO (asynchronously) to fetch another transmit word from host memory to FIFOR. The address in host memory from which the word is retrieved is defined by information stored in DMAR. DMAC manages updating/ incrementing and restorage of that information, as well as determination of when a defined address block has been exhausted. When exhaustion occurs, DMAC either may notify the host system, via SIO and interruption, or it may if pre-programmed to perform a command chaining operation linking it to a new command for smoothly continuing the operation then in process.

To activate an inactive channel, the host computer signals through SIO 23 to store control information in FIFOR, DMAR, and a synchronous memory partition (TSR, described later), which effectively initializes all relevant synchronous and asynchronous partitions relative to that channel. Thereafter, partitions 25, 28 and 29 operate autonomously to transfer data associated with that channel, between an allocated block of spaces in host memory and FIFOR.

Such operations proceed either until either an error or other exceptional condition is encountered, or until the allocated block of space in host system memory is used up; i.e. filled with receive data or completely exhausted of transmit data. In certain instances, DMAC performs command chaining and address chaining operations to automatically extend such operations relative to additional blocks of space in host memory.

Relative to host memory, it is understood that host system program applications attend to the further processing of receive data and to the supply of transmit data, as needed to sustain operations of the IIM partitions relative to the designated spaces.

All of the foregoing partitions 24–29, and their operations (including the foregoing chaining functions of DMAC), are fully described in the above cross-referenced patent applications 1 and 2. Furthermore, desired enhancements of the DMAC partition, for enabling it to operate more efficiently when transferring data and executing chaining functions, are fully described in cross-referenced application 4 above.

Details of these operations are deemed to have no specific relevance presently. To the extent, if any, that such operations may have ancillary relevance, their disclosures in the foregoing cross-referenced patent applications are incorporated herein by reference.

2.2 Synchronous Partitions

Synchronous section 21 comprises circuit partitions 28–36, and 43, associated with what is termed second layer (L2) processing, circuit partitions 38–40 associated with what is termed first layer (L1) processing, and circuit partition 37 which interfaces between the L1 and L2 partitions. The L2 and L1 circuits operate in time division multiplex, but in different time domains, relative to external signalling channels. Partition 37 provides the interface between those domains.

The L1 circuits directly control exchanges of signals at external ports 1, 2A and 2B, and the L2 circuits control the further processing of signals en route between these ports and FIFOR.

The L1 circuits are associated with individual ports—circuit 38 with port 1, circuit 39 with port 2A and circuit 40 with port 2B—and external signal channels associated with respective ports. The L2 circuits operate relative to all external signal channels.

The L2 circuits process receive and transmit data relative to external signal channels cyclically, in time multiplex, in uniquely timed L2 frames consisting of six equal duration time slots. Each slot is associated with a different external channel, and includes overlapping receive and transmit time segments respectively used for processing receive data and transmit data of the respective associated channel. The circuits are idle during slots associated with inactive channels.

Two of the six slots in each L2 frame are associated with the two B channels at port 1, another two slots are associated with the two B channels at port 2A, and the remaining two slots are associated with the D channels at ports 1 and 2A. In accordance with the present invention, the slots associated with the B channels at port 2A are associatable alternately with telephone signalling channels at port 2B. It should be noted that signal activity in the B channels at port 2A and the telephone signal channels at port 2B are mutually exclusive (B channels at port 2A are inactive when port 2B is active and port 2B is inactive when B channels at port 2A are active). Thus, there is no conflict in such dual association of the L2 process time slots.

In each L2 time slot associated with an active receive channel, L2 partitions 35, 30 and 28 process receive data relative to the channel to which the slot is associated. During such processing, receive data is transferred to partition 35 from L1 partition 37 in bit serial bursts containing from 0 to 8 bits of information. Partition 35 deserializes the data, removes any redundant bits from data formatted in certain protocols (e.g. HDLC), and passes the remaining data in byte sets to partition 30. Partition 30 selectively removes special characters or fields from data in certain protocols (e.g. HDLC) and passes remaining data in byte sets to partition 28 (RFM).

RFM stores each byte in FIFOR 27, and keeps track of how many have been stored. When 4 bytes have been stored relative to a receive channel, RFM signals a request associated with that channel to DMARQ which subsequently prompts DMAC to transfer the same 4 bytes asynchronously and in parallel into a preassigned space in host memory.

During transmit time slots, partitions 29 (TFM), 31 and 36 perform a reverse process to prepare transmit data for L1 handling. TFM fetches bytes stored in FIFOR by prior action of DMAC, and passes them to partition 31. TFM keeps track of the number of bytes fetched in each channel, and as the last byte available in FIFOR relative to that channel is fetched, TFM signals a request to DMAC, via DMARQ, causing the latter to interact with host memory to fetch additional bytes of transmit data to FIFOR relative to the same channel.

Partition 31 performs additional processing on formatted data to remove certain fields/characters and passes remaining data in byte sets to partition 36. Partition 36 serializes the data, inserts redundancy bits into formatted data, and passes resulting data to partition 37 in bit-serial bursts containing from 0 to 8 bits.

As noted above, data arranged in special protocols such as HDLC is subject to special processing in partitions 30, 31, 35 and 36. Other data (digitized voice, non-coded picture data, etc.) is transferred through these partitions in the "clear" (no processing other than buffer storage). The special processing functions performed by the L2 partitions are fully described in the above cross-referenced patent applications, and have no particular relevance to the present invention.

The timing of operations performed by the L2 partitions is supervised by Resource Manager partition (RSM) 32 which is paced by signals transferred to it by the L1/L2 interface partition 37. Between recurrences of a time slot allocated to a given channel, in successive L2 frames, signals representing final processing states of all L2 partitions relative to that channel are stored in Time Swap RAM memory partition 33 (TSR). RSM 32 controls addressing of TSR 33 for transferring state information between TSR and the other L2 partitions.

Relative to partitions 28–31, 35 and 36, state information stored in TSR includes the last processed state of receive or transmit data being processed by the respective source partition at the end of the last slot allocated to the respective channel.

Interrupt partition INT, shown at 43, manages the collection of interrupt status information relative to the L1 and L2 circuits, storing such information in TSR 33 and in certain discrete registers of the device. INT also interacts with SIO to prompt the host system to retrieve stored status information at appropriate times. In such interaction, INT presents synchronous interrupt requests to SIO which prompt SIO to present corresponding requests asynchronously to the host system. Relative to the latter requests, the host system when able interacts with SIO to retrieve associated status information.

Another synchronous L2 partition, of special interest presently, is the B Channel Switch partition 34 (BSW). BSW can be programmed (by the host computer system, through SIO) to transfer receive data from partition 30 to partition 31, whereby such data in effect is transferrable directly and synchronously between a receive channel and a transmit channel at external ports without asynchronous handling (i.e. without transferral through FIFOR, host bus, host memory, etc.), and consequently without delays associated with such handling.

BSW is programmable to operate as a time division switch relative to four of the six time slots in each L2 processing frame; in particular, the slots assignable to the B channels at ports 1 and 2A and/or the P (telephone signal channel) at port 2B. Thus, BSW can route signals in either direction between a (B or P) channel at port 2B and a B channel at port 1. Accordingly, voice grade telephone signals can be transferred synchronously between a phone attached to port 2B and a telephone network linked to port 1.

Operations of BSW during each of the four abovementioned slots are synchronized by RSM, and controlled by configuration information passed to BSW from TSR under control of RSM. At the beginning of each of the four slots, configuration information defining operating states of BSW relative to the receive and transmit sub-channels receiving L2 service during that slot is fetched from TSR to a configuration register in BSW (described below).

From the time that receive data is transferred to BSW to the time that the same data is transferred to partition 31 (generally, less than one L2 frame duration) the data is held in a register in BSW assigned to the respective received channel. BSW contains four such registers for serving up to four receive channels in this manner.

When BSW is used to route voice signals between ports 2B and 1, the effect is particularly significant. Long delays in telephone network connections tend to cause unacceptable degradation of voice signals at receiving telephone sets. Thus, such signals could be unacceptably degraded if they were required to transfer through the present asynchronous path (IIM section 22, host bus 4 and host memory), where delays could be very long (on the order of milliseconds or even seconds; especially if the host bus is serving many contending devices). In contrast, the delay through BSW is generally less than the duration of an L2 frame (i.e. less than 102 microseconds), a time which is too brief to have any degradational effect, so that relative to telephone networks the "isochronal" quality of voice signals is unaffected by the delay through the L1 circuits and BSW.

Configuration control information for controlling the state of BSW, relative to each channel linked to that partition, is programmably placed in TSR by the host system (via SIO), when a host system application initiates a process requiring shunt transferral of signals through BSW. This information can be changed by the host system at any time. As will be shown later, the information can be changed even while a telephone network connection exists that requires isochronal transfer of voice signals through BSW; whereby the host system can exchange data "inband" with equipment linked to the same telephone network connection (by momentarily interrupting the BSW connection path in either the receive or transmit direction). This facility to adapt operations of the subject device inband is particularly useful, and an application characteristic of such utility is specifically described below.

Circuits 37 interface between L1 circuits 38–40 and L2 circuits 35 and 36. Circuits 38–40 couple respectively to external ports 1, 2A and 2B. Signals received from a channel at any of these ports, representing receive data, are transferred to circuits 37, buffered in circuits 37, and passed on to partition 30 during an L2 frame time slot allocated to the respective source channel for L2 processing. Signals corresponding to transmit data associated with a given external channel are transferred from partition 31 to circuits 37, during a respective L2 time slot allocated to that channel, buffered in circuits 37 and distributed therefrom to a respective one of circuits 38–40 which is coupled to the respective associated external channel.

Signals transferred between circuit 37 and partitions 30 and 31 during any L2 slot consist of bursts of from 0 to 8 bits (separate bursts of 0 to 8 bits of receive data and/or 0 to 8 bits of transmit data). The interface between circuit the L2 partitions and circuit 37 corresponds to the BTDM (Burst Time Division Multiplex) interface described in application 3 cross-referenced above.

Circuits 38, constituting a first basic rate interface module (BRIM 1), convey signals representing receive and transmit data of channel set (2B+D)_1 (see FIG. 1) between Port 1 and circuits 37. Circuits 39, constituting a second basic rate interface module (BRIM 2), convey signals representing receive and transmit data of channel set (2B+D)_2 (see FIG. 1) between port 2A and circuits 37. Circuits 40, constituting an SLD (Serial Link Data connect) module, convey signals representing telephone signals (voice and control) between port 2B and circuits 37.

As noted earlier, the voice path of port 2B is not activated while either of the B channels of port 2A is active, and conversely when the voice path is active the B channels of port 2A are not allowed to be activated (by the host system) until the voice path of port 2B is deactivated. If a telephone connected to port 2B goes offhook, while a B channel of port 2A is active, the host processor (informed of the offhook condition through an interrupt exchange described later) will delay servicing of the telephone user until all B channels of port 2A have quiesced. If a timeout indicates that the B channels of port 2A are not going to become inactive within a given time, a "busy" signal may be given to the telephone user by the host system.

Similarly, if service to a telephone user is in process when indication is received that a remote terminal requires service through a B channel of port 2A (such indication received via the D channel of that port), the required service will either be delayed until the telephone user finishes (returns telephone to onhook) or a message will be flashed to the telephone user indicating a timed disconnection of his call service after which a B channel of port 2A will be activated.

When a telephone on port 2B goes off-hook, circuits 40 and 37 transfer an associated "offhook" interrupt request signal directly to SIO which latches that signal and presents a corresponding asynchronous interrupt request to the host system processor. Thus, the host processor can react to the "call initiating" request represented by the offhook condition even if the B channels of port 2A are not instantly quiescent.

2.3 L2 SLOT TIMING

Figures 4, 5:
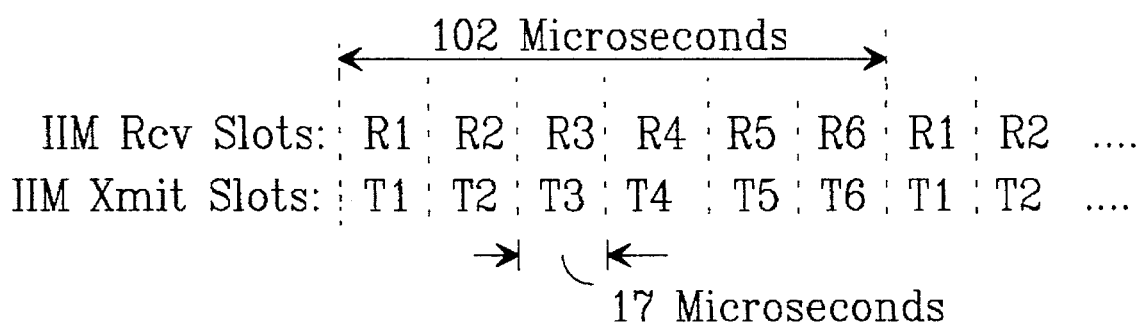
FIG. 4 is a chart illustrating nomenclature used for designating relevant data link ports of the subject device and data communication channels associated with each port.
FIG. 5 is a time chart illustrating the allocation of time division signal processing channels within the subject device for providing data signal handling services between a host computer system and a circuit module contained in the device which forms an interface between L1 (Layer 1) and L2 (Layer 2) circuit modules in the device.

FIGS. 4 and 5 illustrate timing of L2 process frames and nomenclature of channels served during these frames. Timing of L1 port signalling processes is described later in section 4, with reference to FIG. 7.

The L2 partitions operate in time multiplex in recurrent frames of channel service time slots. One such frame is shown in FIG. 5. Slots in each frame are numbered from one to six, and each slot consists of a pair of time-coincident receive and transmit time segments respectively designated Ri and Ti (i=1–6). L2 processing of receive data (RDATA), in each channel actively receiving data, is conducted only during a slot Ri assigned to the respective channel. Corresponding processing of channelized transmit data (TDATA) is conducted only during slots Ti assigned to respective channels. Thus, each channel is capable of being served in full duplex mode.

Referring to FIG. 4, channels served at port 1 are designated B11, B12 and D1, and channels served at port 2A are designated B21, B22 and D2. The channel associated with telephone connection at port 2B is designated P (for "phone"). Although only a single P channel is indicated (and served presently), the codec 9 shown in FIG. 1 is easily adaptable to serve two telephone channels (Pa, Pb), and timing considerations relative to provision of such services are illustrated in FIG. 7 and discussed later in section 4.

Since each channel can operate in full duplex mode, each may include an active receive and transmit subchannel, indicated symbolically by suffixes "/r" and "/t". Thus, receive and transmit subchannels of channel B21 are respectively designated "B21/r" and "B21/t".

L2 slots assigned to B channels linked at port 2A (B21, B22) are also assignable to service signal activity in the P channel (s) associated with port 2B. As noted earlier, activities relative to B channels at port 2A and the channel (s) at port 2B are controlled to occur only at different times. Hence, there is no conflict in serving activities of these channels in common time slot (s).

The foregoing slot frames recur at intervals of 102 microseconds, so that each numbered slot in a frame has a duration of 17 microseconds (⅙th of 102 microseconds). These times are predicated on assumptions relating to the basic rates of signal activities in B and D channels, as defined by existing standards, and an assumed aggregate bit rate of 512 Kb/sec (kilobits per second) in the phone channel(s) P. In accordance with existing ISDN standards cited earlier, B and D channels have aggregate bit rates of 64 Kb/sec and 16 Kb/sec in each direction of communication, occurring in structured frames of 125 microsecond duration which will be described later (in section 4) relative to FIG. 7.

Due to the buffer storage capacities in the L2 synchronous partitions and FIFOR, each channel can have up to 7 bytes (56 bits) of data in transit within the IIM in each direction (receive and transmit). This greatly eases restrictions on the DMAC partition in terms of its allowable worst case of access timing relative to host computer system memory (assuming arbitration contention on the host system bus).

3. B Channel Switch Circuits And Operations

Figure 3:
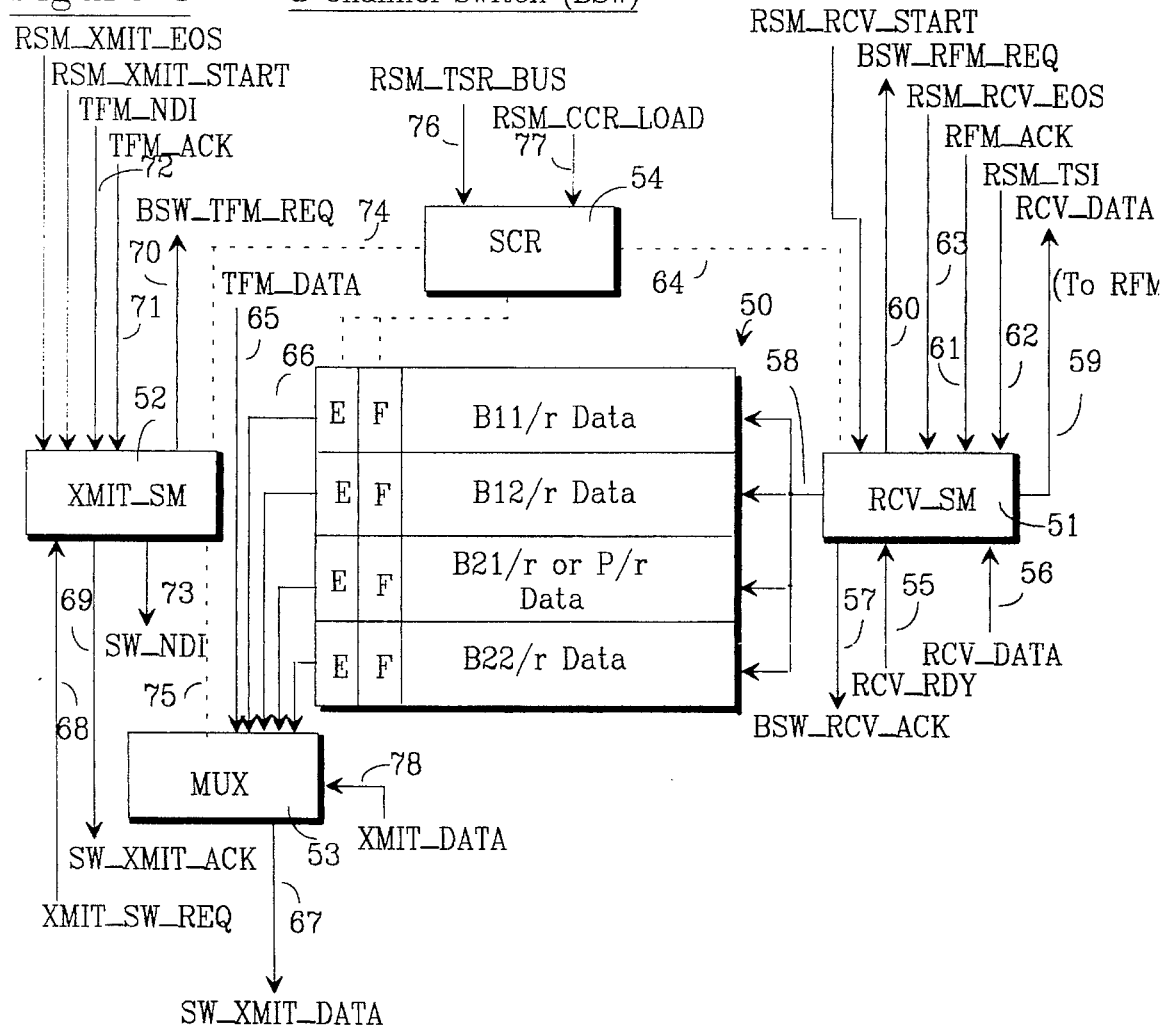
FIG. 3 is a schematic diagram illustrating elements of a B channel switch (BSW) circuit partition shown as a block in FIG. 2.

Circuit details of the BSW partition are shown in FIG. 3. Configurable switching states of this partition are suggested schematically in FIGS. 3A–3D.

As shown in FIG. 3, BSW comprises four registers indicated generally at 50, a receive state machine 51, a transmit state machine 52, a transmit multiplexor circuit 53 and a switch configuration register 54 (SCR). The state machines 51 and 52, and other state machines discussed later, consist of latches and logic circuits configured in a special purpose configuration for performing a respectively associated sequence of logical operations. Descriptions of respective logic functions, as furnished herein, are deemed to provide those skilled in the art with sufficient information for duplicating respective logic circuits.

Registers 50 are used to hold receive data, for shunt transfer from any of the four receive time slots assigned to receive subchannels B1/r, B12/r, B21/r, B22/r and P/r (of which one slot serves both P/r and one of B21/r and B22/r, at different times, as noted above), and any of the four transmit time slots assigned to transmit subchannels B11/t, B12/t, B21/t, B22/t and P/t. Each register 50 has a byte portion for holding a byte of receive data, and two bit portions E and F for holding control bits indicating current occupancy status of respective byte portions.

Bit F indicates when the respective byte portion is currently full or not full. It is set to indicate full when a byte of receive data is transferred into the respective byte portion from partition 30, and reset to indicate empty when the same byte of data is transferred subsequently to partition 31. Bit E indicates if the respective byte portion has ever been full. As explained more fully later, absence of that indication is used to prompt partition 31 to send "fill" characters during the initial phase of activation of a voice connection, and presence of the indication is used to prompt partition 31 to discontinue transfer of fill characters.

Receive state machine 51 controls operations of BSW at its interface with receive partition 30 and associated control signalling operations between BSW and RFM, RSM and partition 30. Transmit state machine 52 controls data transfer operations relative to multiplexor circuits 53 and control signalling operations relative to TFM, RSM, and partition 31 in association with data transfers to partition 31.

Multiplexor 53 gates data from one of six sources to transmit processing partition 31 (FIG. 2). The six sources are TFM, the four register sections of register 50 and under certain special conditions data presented by partition 31. In time slots associated with channels whose transmit data originates in host memory, data from TFM (when available) is gated through multiplexor 53. In time slots associated with channels whose transmit data is being received from another channel, data from a section of register 50 associated with reception in the other channel is gated through multiplexor 53 when the respective register section is indicated to be full (by its bit F discussed above). In the latter time slots, data is also recirculated from the sixth source (partition 31) at the beginning of a transfer sequence, as a "lead pattern" (see section 3.6 below).

In each time slot associated with an active channel, operation is of all partitions—RSM, RFM, TFM, BSM, and partitions 30 and 31—are defined by configuration control information stored in TSR. Such information is fetched from TSR to configuration control registers associated with individual partitions.

The configuration control register associated with BSM is the Switch Configuration Register 54 (SCR, FIG. 3). Configuration control information received in SCR at beginnings of active channel slots define initial states of state machines 51 and 52 in respective slots, which in turn correspond to final states of the same circuits at ends of last previous recurrences of respective slots). Thus operations of BSW relative to each active channel proceed continuously in consecutive recurrences of the slot assigned to the channel.

During slots associated with an active D channel at port 1 or 2A, or an active B channel at port 2A configuration information placed in SCR 54 always configures state machines 51 and 52 so that data bytes when available are gated from partition 30 to RFM (through state machine 51) and from TFM to partition 31 (through mux circuit 53). The effective data routing configuration through BSW is shown in FIG. 3A.

During slots associated with an active B channel at port 1, the configuration information placed in SCR 54 conditions state machine 51 to gage receive data (when available) from partition 30 either to RFM or to-one of the four sections of register 50 associated With the respective reception channel, while conditioning state machine 52 to gate data selectively (when available) to partition 31 from either TFM or a predetermined one of the four sections of register 50 associated with a source reception channel from which data is being shunted through the switch.

3.1 Effective "Positions" Of BSW

Figure 3A:
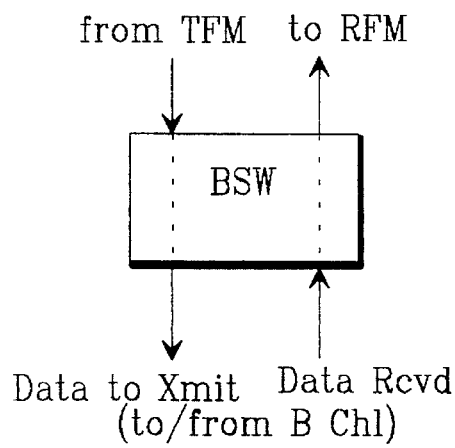
FIGS. 3A thru 3D are schematics showing the ability of the BSW partition to be programmably set to multiple different operating configurations for routing signals selectively between data link ports of the device and either or both a host computer system and a telephone attachment port of the device.
Figure 3B:
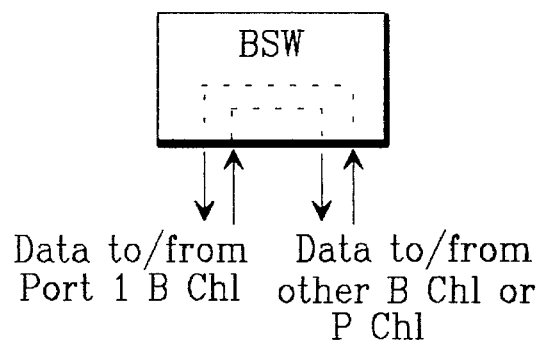
Figure 3C:
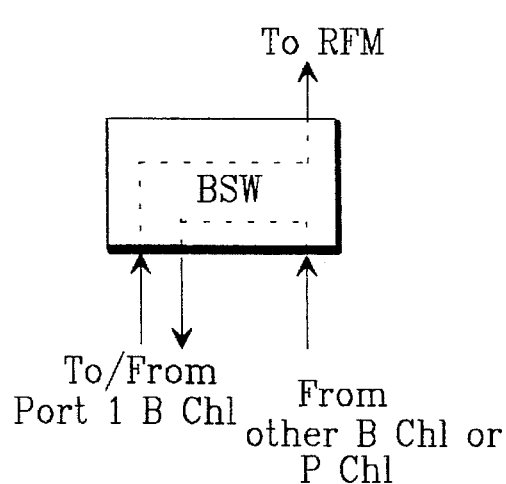

Effective data routing positions of BSW are suggested in FIGS. 3A through 3D. FIG. 3A indicates a full duplex channel connection from a B channel (at port 1 or port 2A) to RFM, and from TFM to the same B channel. FIG. 3B indicates a full duplex connection between two external channels; one of which is a B channel at port 1, and the other either a B channel (at port 2A or the other B channel at port 1, even though this is Hot stated in the drawing) or P channel (at port 2B). FIG. 3C indicates different switch "positions" relative to receive and i transmit sides of a B channel at port 1; in which the receive side is connected through to the host system via RFM, and the transmit side is receiving data shunted through BSW register 50, either from the receive side of another B channel (either at port 2A or the other B channel at port 1) or the receive side of the P channel (at port 2B). FIG. 3 D suggests the reverse switch positions relative to a B channel at port 1; where the transmit side of that channel is connected through to TFM and the receive side of that channel is connected via switch register 50 to the transmit side of either another B channel or the P channel.

Figure 3D:
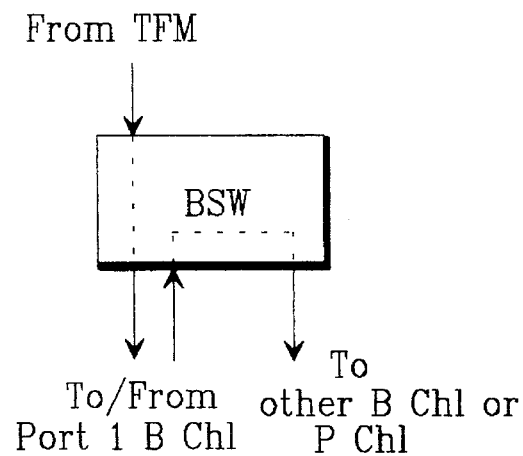

Configuration positions suggested in FIGS. 3B through 3D are of particular interest presently. They indicate that a telephone user at port 2B can have various states of connection with a remote party; e.g. through a local B channel linking to a remote telephone network connecting with the remote party. Furthermore, it will be shown later that these configurations can be varied dynamically by the host system during the existence of a single telephone network connections between the local data link control device and equipment at the remote party's station.

Accordingly, a (local) telephone user at port 2B can have either: (1) a full duplex conversational connection with the remote party (FIG. 3B); or (2) a half-duplex connection over which speech or sound sent from the remote party's telephone can be heard locally, while data is being sent in the opposite direction, from the local host system to equipment at the remote party's telephone station (FIG. 3D); or (3) transmitting speech or sound to the remote party, while data sent from equipment at the remote party's station is being routed locally to the host system via the local B channel supporting the telephone connection (FIG. 3C).

Examples of applications to make use of these configuration possibilities, dynamically, are described in section 5, below.

3.2 Switch Input/Output Nomenclature

In FIG. 3, names of BSW input and output signal parameters are indicated using the nomenclature "A_B_C" or "A_C"; where A and B designate abbreviations of source and destination partitions (as used in FIG. 2), and C designates the parameter. Destinations are omitted where they are easily inferable from other information. Thus, for instance, "RCV_DATA" would represent data presented by receive partition 30 to partitions to which its data outputs connect (i.e. to BSW and RFM, as seen in FIG. 2).

3.3 Details Of BSW Inputs and Outputs

Accordingly, it may be understood now that when receive partition 30 has a byte of data to forward relative to a channel (i.e. in the time slot allocated to that channel), partition 30 presents a ready indication at 55 (RCV_RDY), along with bit-parallel signals representing the data byte at 56 (RCV_DATA). As noted above, BSW state machine 51 transfers receive data either to one of the four sections of register 50 or to RFM. As the data is being transferred, state machine 51 presents an acknowledge indication to partition 30 at 57 (BSW_RCV_ACK).

Receive data is transferred to register 50 through path 58 and to the BSW interface to RFM via path 59. When receive data is being presented to RFM, it is accompanied by a request signal at 60 (BSW_RFM_REQ), and when accepted by RFM an acknowledgement is returned at 61 (RFM_ACK).

In addition to the foregoing inputs and outputs, state machine 51 receives three slot time reference signals from RSM 32. These comprise a time slot indicating reference at 62 (RSM_TSI), a process starting reference indications RSM_RCV_START (via an unnumbered line), and an end of slot indication at 63 (RSM_RCV_EOS). The TSI indication is given separately to all synchronous partitions as an indication of the beginning of a new slot (during which transmit and receive processing occur in time overlap but slightly offset in time). The starting and slot end indications are applied separately to receive partition 30 and RFM, and respectively indicate times for beginning and ending receive processing during a current slot.

Another not-shown indication received by this state machine from RSM is a channel type bit CT indicating the activity state (active/inactive of the channel assigned to be served in the current time slot. This bit and its usage are discussed below in section 3.5, in the more detailed description of this state machine and its sequence of operating states.

Control inputs from SCR to receive state machine 51, suggested at 64, define its operating sequence during the current time slot. As explained later, the only information stored in TSR relative to BSW is slot configuration information. Thus, data presented by partition 30 during a slot can not be acknowledged as received by BSW unless it has been latched in register 50 or passed to (and acknowledged by) RFM before the end of the slot. If, for any reason, that action can not be completed during the current slot (e.g. RFM not ready or the destined section of register 50 still full), acknowledgement BSW_RCV_ACK is withheld and the action must be reinitiated by partition 30 in the next recurrence of the same slot.

On the transmit side of BSW, transmit data is presented to mux circuits 53 from one of six sources shown at 65, 66 and 78. These are: TFM (at 65), one of four sections of register 50 (at 66), and transmit partition 31 (at 78; usage of this last input is described in section 3.6 below). When a request for data is asserted by partition 31 (XMIT_SW_REQ), data from a selected one of these six sources, if then available, is gated to partition 31 via mux output 67 (SW_XMIT_DATA).

This process is controlled as follows. When transmit partition 31 is ready to handle another byte of data, during a current slot, it presents a request (XMIT_SW_REQ) to transmit state machine 52 at 68. When data is available from the source defined by the slot configuration (see discussion below of SCR parameters), which is either TFM or a section of register 50 (and may occur during the current slot or a later recurrence of the corresponding slot), the data is gated through mux 53 and accompanied by an acknowledgement indication at 69 (SW_XMIT_ACK) from state machine 52.

If the source of data (indicated by SCR 54) is TFM, state machine 52 presents a request (BSW_TFM_REQ) to TFM at 70. When data is ready, TFM acknowledges with TFM_ACK, and presents the data accompanied by a "new data" indication at 72 (TFM_NDI). In response to that indication, state machine 52 conditions mux 53 to gate TFM data from 65 to input 67 of partition 31, accompanied by a corresponding new data indication SW_NDI at 73 which is developed By merely gating the TFM_NDI indication to output 72.

If the source is register 50, state machine 52 recognizes a full indication F in the respective register section and conditions mux 53 to gate that data from the appropriate source section at 66 to its output 67. The data at 67 is accompanied by a corresponding SW_NDI indication from state machine 52 at 73 (developed by logical operation of the state machine).

Other inputs to state machine 52 consist of slot timing reference signals from RSM: RSM_XMIT_START and RSM_XMIT_EOS. These are provided to all partitions involved in processing of transmit data (TFM, BSW and partition 31) as signals to respectively begin and end processing relative to the current time slot. Also, the above-mentioned (not-shown) channel type bit (CT) is provided to this state machine by RSM to indicate if the channel assigned for service in the current time slot is active or inactive.

Control inputs to state machine 52 from SCR 54 are suggested at 74. As in receive handling, any transmit data transfer action is either completed during the slot in which it first occurs or deferred to a later recurrence of the same slot.

If the source of requested transmit data is register 50, the transfer is made when the corresponding section of register 50 is full. If the source of data is TFM, the transfer is made when TFM signals new data. If requested transmit data is unavailable before the end of a slot in which the request is initially asserted (e.g. F bit in register 50 remains off, or TFM_NDI remains inactive), the state of waiting for new data is effectively "remembered" by partition 31 (in the state information stored relative to that partition in TSR), whereby that partition is conditioned to reassert its request for new data, XMIT_SW_REQ, at the beginning of the next recurrence of the same slot.

At the beginning of each process time slot, configuration information for that slot is transferred from TSR to SCR via bus 76 (RSM_TSR_BUS), accompanied by a readiness indication from RSM (RSM_CCR_LOAD) at 77. Since such information is changed only by the host system (via SIO, as explained earlier), the information stored in SCR is not written back to TSR at the end of the slot.

3.4 BSW Configuration Fields and Functions

SCR 54 contains four bit positions. One bit, designated the transmit switch enable (TSE) bit, indicates if the source of transmit data in the current slot is register 50 or TFM. A second bit, designated the receive switch enable (RSE), indicates if the destination of receive data during the current slot is register 50 or RFM.

The remaining two bits are designated the source channel select (SCS) field. These bits, in combination, designate one of four sections of register 50 as the source of transmit data for the current slot if other conditions are fulfilled; i.e. if TSE indicates the register as source for that slot, data is requested by transmit partition 31 in that slot, and the regoster section designated by the SCS bits is or becomes full during the slot.

The TSE and SCS bits are applied to transmit state machine 52 at the beginning of each slot. If TSE bit is off (value 0), state machine 52 conditions multiplexor 53 to select TFM as the current source of transmit data, determines when conditions are appropriate for transferring transmit data to transmit partition 31 (i.e. when partition 31 is currently requesting such transfer and TFM currently has data to provide for transfer), and when conditions are appropriate state machine 52 controls signalling to complete the transfer and to acknowledge completion to the source. If bit TSE is on (value 1), state machine 52 conditions multiplexor 53 to select the register section designated by the SCS bits as the current source of transmit data, determines when conditions are appropriate for transferring such data to partition 31 (i.e. when data is being requested currently by partition 31 and the designated section is currently full), and when such conditions exist the state machine controls signalling to complete the transfer and alter the full status of the source register section.

The RSE bit is applied to receive state machine 51 at the beginning of each slot. If the bit is off (value 0), and receive data is presented by partition 30 during that slot, the state machine directs signalling relative to RFM for transferring that data to RFM and signalling relative to receive partition 30 for acknowledging completion of the transfer. If the RSE bit is on (value 1), and partition 30 is presenting receive data during the slot, receive state machine 51 selects a preassigned one of the register sections as the destination of the receive data (the top section if the slot is associated with channel B11/r, the next section if the slot is associated with B12/r, the next section if the slot is associated with either B21/r or P/r, and the bottom section if the slot is associated with B22/r), determines if the selected section is currently vacant and, if it is, directs operations for: transferring the data to that section, modifying the section occupancy status to full and acknowledging completion to receive partition 30. If data is being presented but the destination is not ready (RFM not ready or selected section already full), acknowledgement of the transfer is withheld and if this continues for the remainder of the slot, partition 31 will remember (via the status stored for it in TSR) and present the same data again in the next recurrence of the corresponding slot.

3.5 BSW Receive State Machine

The receive state machine operates as described in the preceding section to control transfers of data from partition 30 to either RFM or a preassigned section of register 50. Specific states and operations of this state machine are described next.

State 0: Idle State

Upon receiving RCV_START, check channel type bit CT (provided by RSM but not shown in drawing) indicating if channel assigned to current time slot is active or inactive. If channel is inactive, reset E and F bits in associated section of register 50 (to clear any indication of past data transfer activity relative to this channel) and remain in state 0.

If channel now being served is active, check RSE bit in SCR. If on/enabled, go to state 1. If off/disabled remain in this state. In this state, receive data presented by partition 30 is transferred directly to RFM when the latter is ready. When such data is accepted by RFM (RFM_ACK asserted), assert BSW_RCV_ACK to indicate completion of transfer action to partition 30.

State 1: Wait For RCV_RDY indication from partition 30.

If RCV_RDY is or becomes active before time slot ends (i.e. before RSM_RCV_EOS is asserted), go to state 2. Else, return to state 0 upon receipt of RSM_RCV_EOS.

State 2: Accept Receive Data

Check full bit of switch register section assigned to channel currently being served. If section is full, no action is taken until full bit turns off. If slot ends before full bit turns off, go to state 0 when RSM_RCV_EOS is asserted. If full bit is or gets turned off, transfer receive data byte to corresponding register section, set E and F bits of that section (E to indicate activity, F to indicate present full status), assert BSW_RCV_ACK to partition 30, and go to state 3.

State 3: Waste State

Go to state 1 (to allow for possibility of two receive ready indications in one slot, while allowing return to state 0 through state 1 if no further ready indication is asserted before slot ends).

3.6 BSW Transmit State Machine

The transmit state machine controls transfers of transmit data to partition 31 from either TFM or one of the switch registers 50. Specific states and actions of this element are described next.

State 0: Reset State

If channel is active (not-shown CT bit provided by RSM is on), check TSE bit for switch enablement. If TSE bit is off (switch disabled), and transmit data is being requested by partition 31 (XMIT_SW_REQ active), transfer request to TFM (assert BSW_TFM_REQ). When data is provided by TFM (TFM_ACK and TFM_NDI asserted), condition multiplexor 53 to transfer the data directly to its output interface, and indicate data availability to partition 31 by asserting SW_NDI.

If channel is active and TSE bit is on (switch enabled), go to state 1.

State 1: Wait For Transmit Data Request

If transmit data request from partition 31 (XMIT_SW_REQ) is or becomes active before end of current slot go to state 2. Else, return to state 0 at slot end.

State 2: Transfer Transmit Data From Switch Register

Check E and F bits of register section designated by SCS (source channel select) bits in SCR. If F bit is off (indicating section is vacant) and E bit is on (indicating past activity) do nothing. If both E and F are off, gate data from mux input 78 (XMIT_DATA) to mux output 67 (such data forming part of a "lead" pattern, which is sent when starting transfers through the switch, in order to prevent an error state in the external channel due to absence of transmission). If both E and F bits are on, gate data from respective section of register 50 to mux output 67. Whenever data is gated to mux output 67, assert SW_NDI and SW_XMIT_ACK to partition 31 (to respectively indicate data availability and acknowledgement of respective request). Next state is state 3.

State 3: Waste State

Do nothing, and go directly to state 1.

4. Details Of L1 Circuits and L1/L2 Interface Circuits

Structure and operations of L1 circuits, shown at 38–40 in FIG. 2, and L1/L2 interface circuits shown at 37 in FIG. 2, are explained next with reference to FIGS. 6–9.

4.1 Timing Considerations—Internal/External

As background to the operations and circuits to be described it is considered desirable to understand the timing of signal frames at the L1 port interfaces, the relation of such to L2 frame timing and how these timings are effectively used and coordinated by the L1/L2 interface circuits. This section deals with these timing considerations.

FIG. 7 illustrates, from top to bottom, frame timing at: the L1/L2 interface (which corresponds to the L2 frame timing shown in FIG. 5), the port 2B interface, and the ports 1 and 2A interfaces.

The illustration relative to the L1/L2 interface shows the timing of receive frames, and allocation of slots within each frame to specific receive channels. Transmit timing at the same interface is identical and time-coincident with receive frame timing, and slots in each transmit frame are assigned in correspondence with receive slots; i.e. to the transmit sides of the same channels. Thus, slots R1 and T1 are assigned to channels B11/r and B11/t, slots R2 and T2 are assigned to channels B12/r and B12/t, etc.

In each L1/L2 interface frame, the fourth and fifth slots are assignable either to the B channels at port 2A or P channels at port 2B. Note that two P channels, Pa and Pb, are indicated in the drawing although the device presently contemplated supports programming of only one of these channels (via SIO, etc.) and data signal transfers only relative to that one channel.

Each L1/L2 interface frame has a duration of about 102 microseconds, and each slot within the frame has a duration of about 17 microseconds (⅙ of 102 microseconds).

Signal frames at ports 1, 2A and 2B interfaces each have durations of about 125 microseconds. This is about 23 microseconds longer than an L2 frame. The significance of this frame timing difference, in preventing error due to slippage between local and remote clocks, will be appreciated as this description develops and is also fully explained in the cross-referenced patent application number 3 relating to the burst time division multiplex (BTDM) interface concept.

Each 125 microsecond frame at the SLD-Codec (port 2B) interface, consists of equal duration, non-overlapping, sub-frames (each about 62.5 microseconds duration) respectively allocated for reception and transmission of telephone circuit information. During each such sub-frame, 32 bits of information can be received or transmitted (received during receive sub-frame and transmitted during transmit sub-frame).

Of the 32 bits so received or transmitted, 16 can correspond to voice/sound (8 bits in each of two voice channels, Pa, Pb, that are potentially serviceable at this interface), 12 bits can be control information C (6 bits in each of the channels potentially serviceable), and 4 bits can be signalling bits S (2 bits in each of the channels potentially serviceable). The control bits C are useful for controlling the programming of states of the Codec circuits and telephone equipment connecting to device port 2B. The signalling bits are useful for defining network path control functions (i.e. are functional counterparts of signals transferrable in D channels at the ports 1 and 2A interfaces).

The 64 bits of signal information that can be handled during each port 2B frame translate to an aggregate bit rate of 512 Kb/sec (kilobits per second), and the 8 bits of voice information that can be handled in each direction during each such frame translate to a signalling rate of 64 Kb/sec in each direction.

The frames at ports 1 and 2A comprise time-coincident time segments for reception and transmission. During each frame at port 1 or 2A, signals representing 48 bits of information can be handled; 24 bits in the receive segment and 24 bits in the transmit segment. Of the 24 bits so received or transmitted in each frame segment, 16 bits can be B channel data (8 bits of data in each of two B channels), 4 bits can be D channel data (2 bits of data in each of two D channels), and the remaining 4 bits are reserved for control and framing purposes relative to the signals representing data undergoing transfer in the three B and D channels.

This translates to potential bit rates of 64 Kb/sec in each direction in each B channel, and 16 Kb/sec in each direction in each D channel.

The L1/L2 interface circuits described next effectively pace the transfers of information which occur at its interfaces to both the L1 and L2 circuits.

4.2 L1/L2 Interface Circuits

Figure 6:
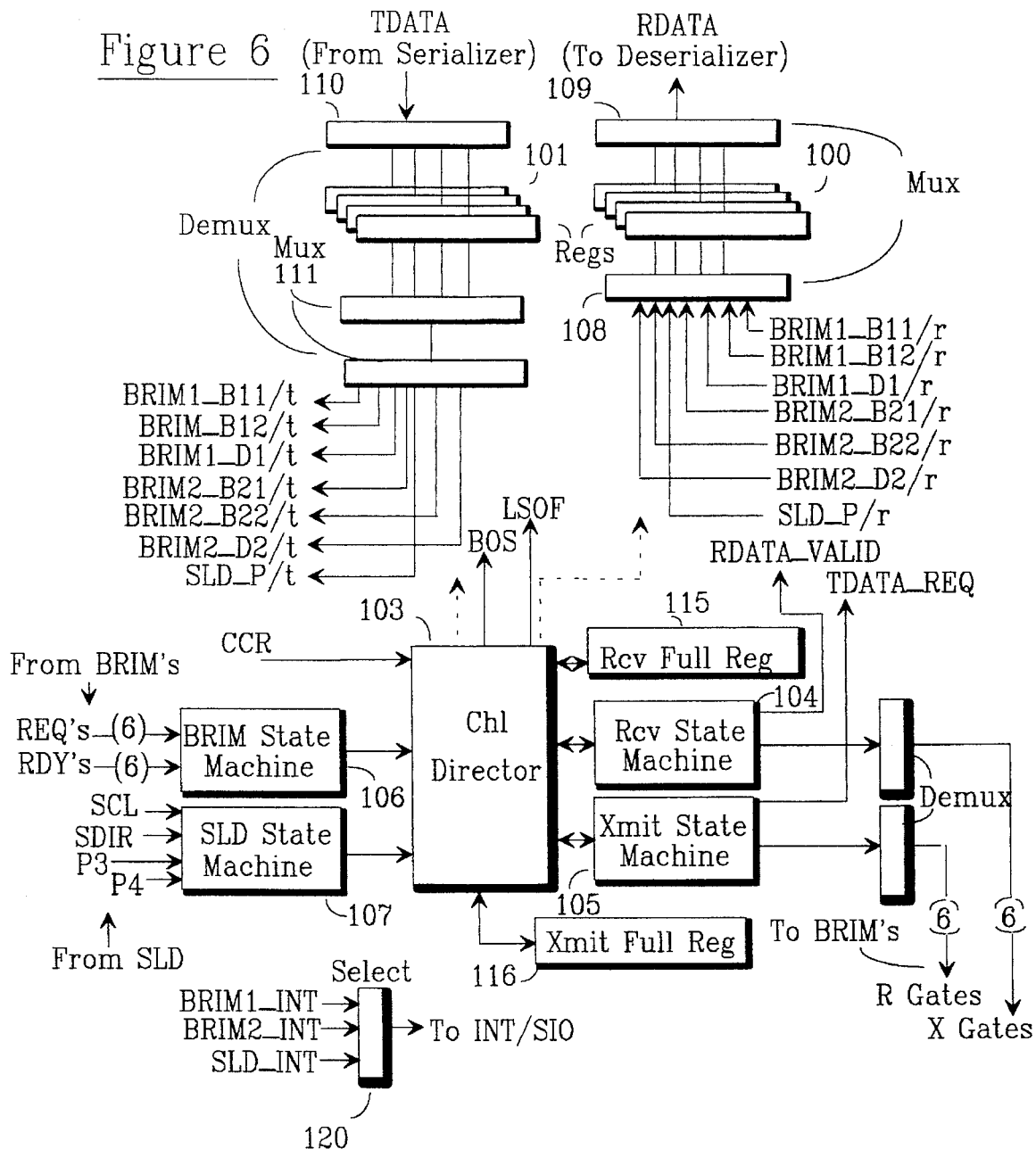
FIG. 6 is a schematic of the L1/L2 interface circuit module just mentioned.

FIG. 6 illustrates the internal organization of the L1/L2 interface circuits, those shown at block 37 in FIG. 2. The main elements of this circuit partition are receive and transmit data register banks, respectively shown at 100 and 101, "director" logic shown at 103, and four state machines shown at 104–107.

Register banks 100 and 101 respectively hold receive data (RDATA) and transmit data (TDATA) signals in transit between the L1 and L2 circuits. Each bank can hold up to 8 bits of data relative to each channel served in the L2 time slots (FIGS. 5 and 7), and consists Of three 8-bit registers and one 2-bit register.

One 8-bit register in each bank is used to hold data in transit between BRIM circuits (38 and 39, FIG. 2) and the L2 interface (35 and 36, FIG. 2); i.e. data and control signals associated with external B and D channels. The remaining registers in each bank are used to hold signals in transit between the SLD circuits (circuits 40, FIG. 2) and the L2 interface; i.e. data and control signals in transit to and from P channels.

Director circuit 103 controls gating circuits 108–111 through which all signal transfers into and out of each register bank are passed. Circuits 108 and 109 are controllable to direct receive data bits, one at a time, into and out of any bit position in any register in receive bank 100. Circuits 110 and 11 are controllable similarly to direct transmit data bits, one at a time, into and out of any bit position in any register in transmit register bank 101.

State machines 104–107 include a receive state machine 104, a transmit state machine 105, a BRIM state machine 106 and an SLD state machine 107.

BRIM state machine 106 monitors ready (RDY) and request (REQ) signals from the BRIM's which respectively indicate readiness to transfer a bit of data from the BRIM's relative to individual receive and transmit channels. Since there are six such channels (four B and two D channels), a total of six different REQ and six different RDY indications are provided.

SLD state machine 107 monitors control signals from the SLD circuits, signals SCL, SDIR, P3 and P4, which indicate readiness of those circuits to transfer P channel signals relative to the L1/L2 interface. In the arrangement presently illustrated, only one P channel is operated, and the monitored signals indicate activity readiness relative to only that one channel.

In cooperation with director 103 and registers 115 and 116, the latter respectively indicating full conditions in registers of banks 101 and 100, the receive and transmit state machines 104 and 105 control issuance of channel-specific X and R gating control signals which control transfers of B and D channel information bit signals, one at a time, between the BRIM's and register banks 100 and 101. The X gate signals control transfers of receive data into receive bank 100, and the R gates control transfers of transmit data out of transmit bank 101.

Bit signals are transferrable into the receive register bank 100 from seven discrete sources. The latter are associated with the six 7B and D channels serviceable by BRIM's 1 and 2, and the P channel handled by the SLD circuits. Receive delta bit signals are received one at a time from each source, and directed into a selected bit position of a selected register in bank 100, by operations of mux (multiplex) gating circuits 108. Operations of these gating circuits relative to the 8-bit register associated with B and D channel transfers are controlled by X gating signals produced by receive state machine 104 through (1 to 6) mux circuits 120; such signals serving also as acknowledgements to the BRIM circuits of individual bit transfers relative to respective receive channels.

Signals are transferrable out of receive register bank 100 to the RDATA L2 burst interface, one at a time, by operations of mux gating circuits 109. Operations of gating circuits 109 relative to the 8 bit register assigned to B and D channels are controlled by signals supplied by receive state machine 104. With each bit transferred out, state machine 104 presents an RDATA_VALID indication to the L2 partition 35 requiring the latter to accept the respective bit within a set (very short) time.

Relative to each channel, RDATA bits are transferred to the L2 interface only during the respective L2 time slot assigned to the channel. During the respective slot, bits are transferred in a burst consisting of from 0 to 8 bits. The loading and emptying of individual registers in receive bank 100 are coordinated in time by director 103, so that a register associated with the channel to be served in the next L2 slot is being loaded (from a BRIM or the SLD circuits) during the preceding L2 slot and is thereby reusable during any L2 frame to hold data of plural channels.

Since the L2 frame time (102 microseconds) is more than 17 microseconds shorter than the (125 microsecond) frame times at the external port interfaces (see FIG. 7), it should be understood that it is virtually impossible to receive more than 8 bits relative to one channel at a port interface, in the time between successive recurrences of the L2 slot assigned to that channel. Furthermore, since the receive bank, can store up to 8 bits relative to any channel in that interval, it is understood that the maximum rate of receive data flow can be handled easily between the L1 circuits and the L1/L2 interface, regardless of relative drifts of local and remote clocks in the external paths leading to the BRIM and SLD circuits.

This capability to withstand clock drift, due to the differences in timing at the L2 and L1 interfaces, is termed positive slip. It is described at length in cross-referenced patent application number 3 cited earlier. With positive slip operation, the only factor which can create an overrun in receive bank 100 is if L2 receive partitions are unable to accommodate receive bits presented by the L1/L2 circuits during an L2 receive slot. Due to extensive pipeline buffering capability in the L2 receive path, of up to 7 bytes per channel (3 bytes in receive partitions 35, 30 and 28, and 4 bytes in FIFOR 27), and access time requirements placed on the host computer bus system (refer e.g. to cross-referenced patent application number 4 cited earlier), the likelihood of such overrun occurring is very small.

Since bank 100 includes separate registers for the SLD receive path (two 8-bit registers and one 2-bit register) it can be understood that all receive data and control signals entering the SLD path during any L2 frame can be properly accommodated in the receive bank and beyond (i.e. in the L2 synchronous partitions and either switch BSW or the path through FIFOR and DMAC).

Similar considerations apply to transfers of transmit data from the L2 interface to external ports. In each L2 slot, a burst of from 0 to 8 TDATA bits is transferred from L2 serializer circuits 36, through gating circuits 110, to a predetermined register in transmit bank 101 to which the burst time slot is associated. As data is being loaded into the associated register in bank 101, any bits retained in that register from a preceding slot are unloaded (to a BRIM or SLD path). Thus, each register in bank 101 is reusable repeatedly during each L2 transmit frame.

As in the receive path, this coordination, plus the relative timing of frames at the L2 and port interfaces, ensures positive slip operation sufficient to withstand virtually any rate of drift between local and remote transmit clocks.

Shown at 120 is an interrupt selection circuit for transferring interrupt indications from the BRIM's and SLD. The SLD indication, SLD_INT, is derived directly from an IIM pin connected to the interrupt line from the telephone set coupling circuits (see line 12, FIG. 1) and effectively indicates a change in telephone hook status (onhook to offhook, or offhook to onhook).

These interrupt indications are presented to the host system through coordinated request actions by INT and SIO, and coordinated status retrieval actions by the host system and SIO. Such actions are fully described in cross-referenced patent applications 1 and 2 cited earlier. To the extent that such information may have ancillary relevance presently, disclosures of said patent applications are incorporated herein by this reference.

Upon receiving indication of a change in hook status at port 2B, the host computer system acts to provide appropriate service relative to that indication (interacts with local telephone user and signal network, if change to offhook status is sensed, or terminate BSW switch configurations if change to onhook status is sensed).

4.2.1 Signal Definitions

| | |
|---|---|
| BOS | Timing indication passed to L2 partition RSM to indicate beginning of an L2 slot other than the last slot of an L2 frame (see LSOF definition) |
| BRIM1_XXX | Represent signals originating at BRIM 1 |
| BRIM2_XXX | Represent signals originating at BRIM 2 |
| BRIMi_Bj/r | Represent receive data signals from BRIM i (i = 1 or 2) in channel B j (j = 11 or 12 if i = 1, or 21 or 22 if i = 2) |
| BRIMi/Di/r | Represent receive data from BRIM i in channel Di (i = 1 or 2) |
| BRIMi_Bj/t | Represent transmit data to BRIM i (i = 1 or 2) in channel Bj (j = 11 or 12 if i = 1, and 21 or 22 if i = 2) |
| BRIMi_Di/t | Represent transmit data to BRIM i in channel Di |
| LSOF | Timing indication passed to L2 partition RSM to indicate beginning of a last slot in an L2 frame |
| CCR | Channel configuration information from RSM indicating the configuration of the channel being served during the current L2 slot |
| P3, P4 | Signals from Codec identifying the P channel currently served (in present embodiment only one P channel is used) |
| RDATA | Line presenting receive data to L2 interface |
| RDATA_VALID | Signal indicating that RDATA line has valid data signal |
| RDY's | Channelized ready indications from BRIM's (three from BRIM 1 and three from BRIM 2) indicating availability of receive data bit from respective receive channel on line BRIMi_Bj/r or _Di/r |
| REQ's | Channelized transmit data requests from BRIM's (three from BRIM 1 and three from BRIM 2) requesting transfer of data bit to associated channel line BRIMi_Bj/t or _Di/t |
| SCL | Clock signal (512 KHz) from codec coinciding with transfers of receive data bits in P channel |
| SDIR | Direction signal from codec (receive or transmit) |
| SLD_P/r | Line presenting receive data from SLD |
| SLD_P/t | Line presenting transmit data to SLD |
| TDATA | Line presenting transmit data from L2 circuits |

4.2.2 Director

Channel director 103 contains five counters controlling its operations. These include: a three-bit channel counter, an eight-bit cycle counter, and three four-bit counters. The four bits counters serve as data bit transfer counters relative to the receive, transmit and BRIM state machines. The SLD state machine does not require a data bit transfer counter since the P channel protocol calls for transfer of a fixed number of data bits in each port 2B frame.

The cycle count steps cyclically through count values from 0 to 205, and the channel count steps cyclically through values from 0 to 4. When the cycle count value reaches 205, the value is reset to 0. If the channel count value is 4 when the cycle count reaches 205, both the cycle count and channel count values are reset to 0. The cycle and channel count values, and the channel configuration information received from RSM, are used to determine which channel is currently being served relative to the register banks and the L1 circuits (BRIM's and SLD).

When the cycle count value transitions to 1, a beginning of L2 slot indication is activated, either BOS or LSOF. If the channel count value is other than 4 when the cycle count becomes 1, the BOS (beginning of slot) indication is activated. If the channel count is 4 when the cycle count becomes 1, the LSOF (last slot of frame) indication is activated.

When the cycle count value reaches 40, the BRIM originated ready signal (RDY) associated with the channel currently being served is latched by the BRIM state machine to start the sequence of activity for transferring a receive data bit from the associated BRIM to the receive register bank. If the associated BRIM has received any receive data bits in the respective channel during the preceding L2 frame, a RDY indication associated with that channel will be active when the cycle count reaches 40. Thereafter, the director and state machines proceed automatically to service successive RDY indications in the associated channel (understood to be limited to 7 or fewer indications during the current cycle, in view of the relative frame timings at the L2 and L1 interfaces).

When the cycle count value reaches 57, the transmit data request (REQ) associated with the channel currently being served is latched by the BRIM state machine, initiating sequence of actions for transferring a next bit of transmit data from the transmit register bank to the associated BRIM. Thereafter, the sequence of transferring a bit and latching a successive REQ indication relative to the same channel proceeds automatically until the cycle ends.

4.2.3 Receive State Machine

Specific states and operative actions of this element are described next.

State 0 (Idle Until Channel Setup Time Elapsed)

If channel setup time has elapsed (specific cycle count met), go to state 1; else, stay in present state.

State 1 (Examine Status Of RCV Data Registers)

If currently selected receive data register (register in bank 100 selected by mux logic 108, FIG. 6) is empty, no data is to be transferred to the RDATA interface; go to state 0. Else, go to state 2.

State 2 (Assert RDATA_VALID)

Assert RDATA_VALID and go to state 3.

State 3 (Increment Bit Counter)

Increment receive bit counter (in Director 103) and shift contents of currently selected receive data register one bit to prepare next bit for transfer to RDATA interface. If this is the last bit to be transferred in current L2 time slot, reset appropriate bit in RCV Full Register 115 and go to state 0. Else, go to state 2.

4.2.4 Transmit State Machine

Specific states and operative actions of this element are described next.

State 0 (Idle Until Channel Setup Time Elapsed)

If channel setup time has elapsed (specific cycle count met), go to state 1; else, stay in present state.

State 1 (Check SLD Enable And BRIM Requests)

If enabling signal from SLD is asserted, relative to channel currently being served at L2 interface, and currently selected transmit data register (register in bank 101 selected by logic 110, FIG. 6) is full, or if CCR status indicates currently selected channel is inactive, return to state 0; else go to state 2. Also, if BRIM request is asserted relative to channel currently being served at L2, go to state 2 (this request is latched at a predetermined cycle count time relative to the current L2 slot).

State 2 (Assert TDATA_REQ)

Assert TDATA_REQ to the L2 transmit interface (request for transfer of a TDATA bit), and go to state 3.

State 3 (Increment Transmit Bit Counter) Increment transmit bit counter (in Director 103) and shift next TDATA bit into currently selected transmit data register. If this is last (8th) bit, and channel currently served is neither a D channel nor a B channel running restricted protocol (requiring "maximum" external bit rate of 56 KB/sec., and actions by IIM to insert "1" bits in 8th bit positions of transmitted bit sets), set appropriate full bit in XMIT Full Register 116 and go to state 0. If this is last bit, and channel being served is neither a D channel nor a B channel running a restricted protocol, go to state 4. Else, go to state 2 to request more TDATA.

State 4 (Increment Bit Count—Restricted Channel) Increment transmit bit counter and go to state 5.

State 5 (Set Full Bit For Restricted Channel) Set full bit in the XMIT Full register 116, and go to state 0.

4.2.5 BRiM State Machine

Specific states and operative actions of this element are described next.

State 0 (Reset State)

If a RDY signal is outstanding from the BRIM associated with the channel currently being served, assert corresponding X gate signal relative to that BRIM and go to state 1. If the transmit data register is full, go to state 2. Else, remain in this state. While in this state reset the BRIM bit count in the chl director.

State 1 (Transfer Bit Relative to BRIM)

Shift data bit, either from BRIM into receive register bank or from transmit register bank to BRIM; and increment respective bit count. If this is not last (8th) bit, assert gate signal to BRIM and go to state 2. If this is last bit, reset the BRIM's outstanding RDY or REQ signal, set the respective Full register indication, and go to state 2.

State 2 (Waste State)

This state is used to synchronize between L2 and L1 processes, since L2 clock is twice the frequency of L1 clock. Assert gate signal to BRIM and go to state 1 for next bit transfer.

4.2.6 SLD) State Machine

Specific states and operative actions of this element are described next.

State 0 (Reset State)

If SCL is active, and P3 and P4 are valid, go to state 1. Else, stay in this state.

State 1 (Waste State)

This state allows time for SLD signals to stabilize. Go to state 2.

State 2 (Determine Bit Transfer Direction)

If SDIR is a logical 1, operation is an RDATA bit transfer from Codec to L2; go to state 3. If SDIR is logical 0, operation is a TDATA bit transfer from L2 to Codec; go to state 5.

State 3 (Wait For SCL To Be Deasserted For RCV)

If SCL is deasserted, shift bit from SLD into receive data register and go to state 4. Else, remain in this state until SCL is deasserted.

State 4 (Wait For SCL To Be Reasserted For RCV)

If at end of a channel time slot (indicated by changes in P3 and P4 signals), set appropriate full bit in RCV Full register 115 and go to state 0. If not at end of channel time, and SCL is reasserted, go to state 3. Else, remain in this state.

State 5 (Wait For SCL To Be Deasserted For XMIT)

If SCL is deasserted, shift TDATA bit out of transmit data register to SLD and go to state 6. If SCL is not deasserted, remain in this state.

State 6 (Wait For SCL To Be Reasserted for XMIT)

If at end of channel time (indicated by changes in P3/P4), reset full bit in XMIT Full register 116 and go to state 0. If not end time, go to state 5 when SCL is reasserted. Else, stay in this state.

4.3 BRIM Circuits

Figure 8:
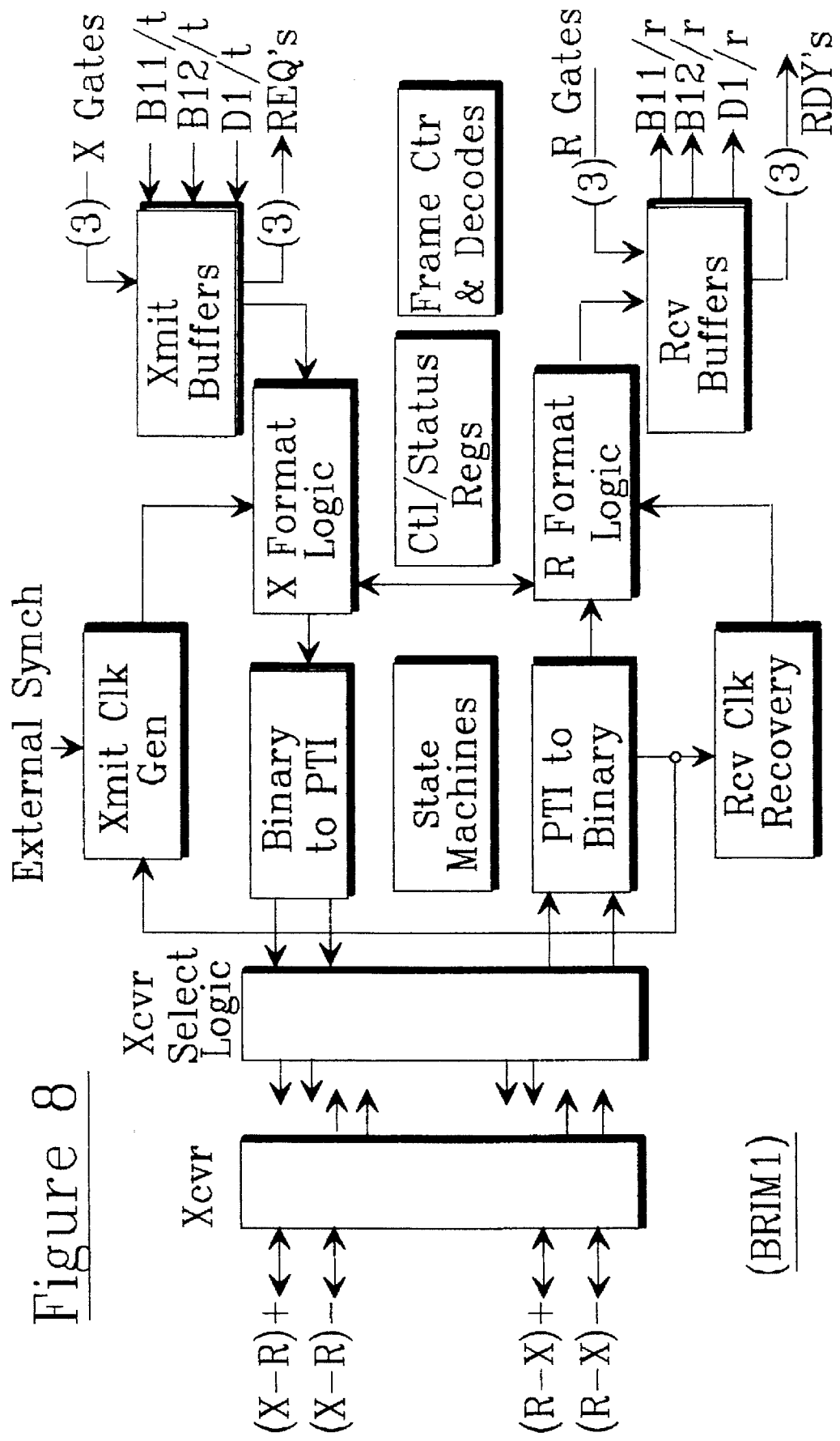
FIG. 8 is a schematic of a BRIM circuit module in the L1 circuits of the subject device.

BRIM circuits which interface to port 1 are illustrated in FIG. 8. Principal elements of these circuits are shown at 140–156. Interfaces to port 1 and the L1/L2 circuits just described are indicated respectively at 160 and 162. The BRIM circuits which interface to port 2A are identical, but have different signal interfaces to the L1/L2 circuits and port 2A in accordance with signals presented at said interfaces.

Transceiver circuits 140, interfacing to the respective port, have positive and negative phased differential transmit/receive signal outputs, indicated respectively at T/R+ and T/R−, and positive and negative phased differential receive/transmit inputs indicated respectively at R/T+ and R/T−. Circuits 141 convert outgoing signals from internal to external binary signal forms; e.g. from baseband binary to PTI (Pseudo-Ternary Inverted) form specified for ISDN networks. Circuits 142 provide reverse conversions of incoming signals from external to internal binary forms.

Transceiver select logic 143 directs signal transfers between transceiver circuits 140 and circuits 141 and 142. Transitional outputs of receive conversion circuit 142 are applied to receive and transmit clock recovery circuits, 144 and 145 respectively. Outputs of the latter circuits are applied to respective receive and transmit formatting logic circuits, 146 and 147 respectively.

Receive formatting logic 146, operating under control of timing signals furnished by clock recovery circuits 144, transfers incoming receive bit signals from circuits 142 to receive buffer circuits 147 where bit signals arriving in each of the 3 associated receive channels (B11/r, B12/r, D1/r) are staged for transfer to the L1/L2 interface circuits.

Buffers 147 hold up to 8 bits per each channel, and ready indications, RDY, associated with the channels (i.e. 3 separate indicators) are asserted to the L1/L2 interface circuits while bit buffers dedicated to respective channels are occupied (i.e. contain at least one bit).

These RDY indications prompt the L1/L2 interface circuits to accept buffered receive bits relative to respective channels (at times determined by the L1/L2 circuits), such acceptance being signalled by channelized R gating signals furnished by the L1/L2 circuits. In response to each R gate signal, a buffer position occupied by the accepted bit is reset by circuits 147.

Transmit format logic circuits 148, operating under control of timing signals furnished by transmit clock generating circuits 145, transfer outgoing bit signals from channelized transmit buffer circuits 149 to form conversion circuits 141. Circuits 149 hold outgoing bits received from the L1/L2 interface circuits in channelized buffer positions associated with transmit channels B11/t, B12/t and D1/t, and furnish respective channelized transmit request indications, REQ, which prompt the L1/L2 interface circuits to transfer individual outgoing bit signals. Bit signals presented by the L1/L2 interface circuits, in response to REQ indications, are accompanied by channelized transmit gate control indications (X Gates) which prompt circuits 148 to accept and register respective bit signals.

Operations of circuits 143–149 are controlled by state machines 150. The latter circuits orchestrate the establishment and maintenance of frame oriented communications in accordance with and as defined by existing standards for L1 operation in 2B+D ISDN networks. Circuits 151 provide a programming interface to the host computer system, registering control information furnished by the system and signals representing process status for transfer to the system. Outputs of circuits 151 define operations of state machines 150, and through the latter designate the type of signal interaction between the respective partition and external networks. Circuits 152 constitute frame counters and decoders which control the timing of state machine operations relative to external network time frames.

4.4 SLD (Serial Link Data) circuits

Figure 9:
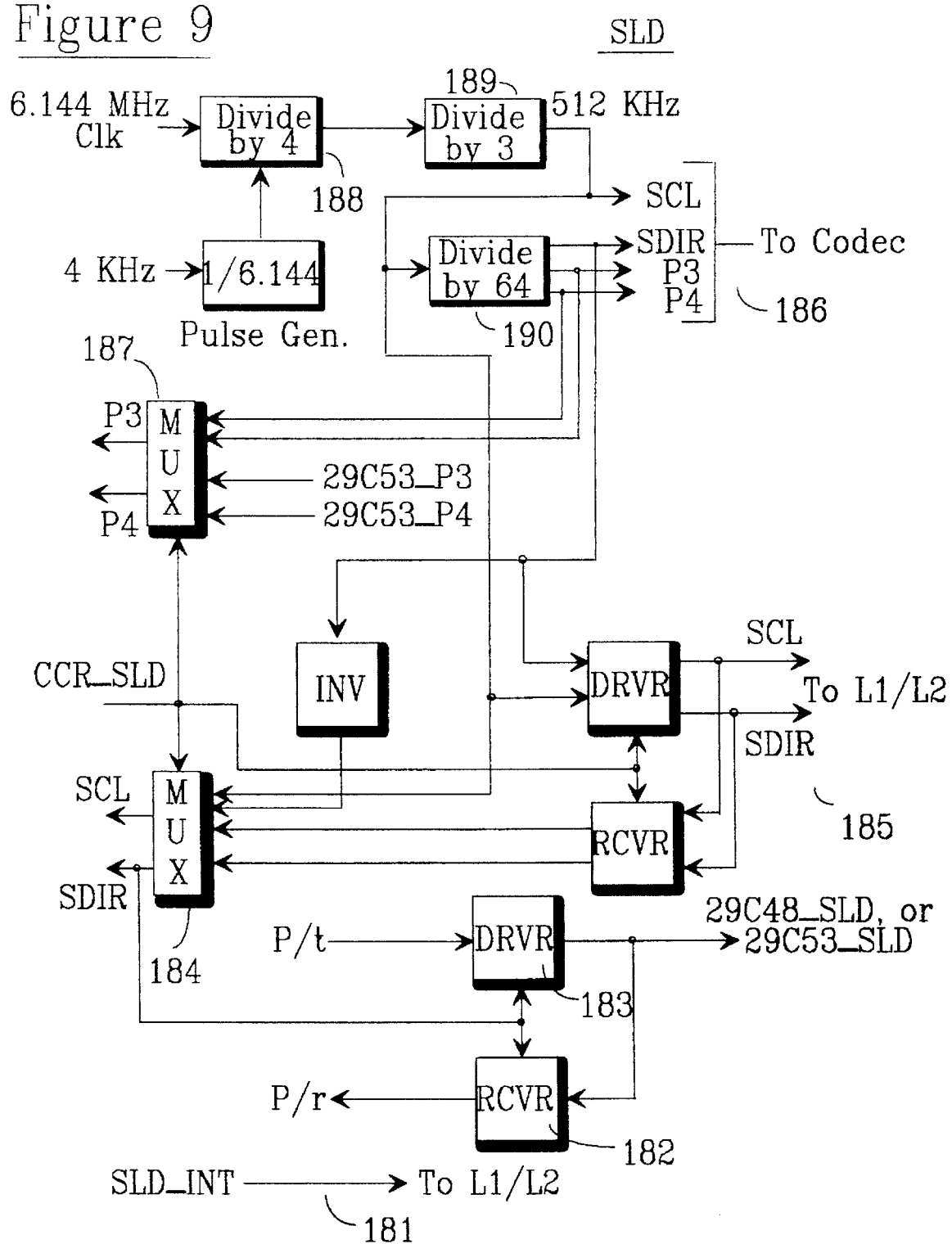
FIG. 9 is a schematic of an SLD (Serial Link Data transfer) circuit module for coupling signals between the telephone port of the subject device and the interface circuits of FIG. 6.

The SLD circuits, shown in FIG. 9, provide timing and control signals to both the Intel Codec (element 9, FIG. 1) and the L1/L2 interface circuits of FIG. 6, and control transfers of signals representing telephone sound (in digitized form) between the external codec and the L1/L2 interface circuits.

The codec is of course connectable to a telephone set via additional analog circuitry (block 10, FIG. 1). Both the SLD circuits and the analog circuitry for interfacing to telephone devices are arranged in accordance with functional specifications and signal timing information provided by Intel Corporation in its Microcommunication Handbook (e.g. in Chapter 5 of the handbook, "Preliminary Specifications iATC 29C53AA Digital Loop Controller" and "iATC 29C48 Feature Control Combo", Intel Corporation October 1988, and referring to respective Intel Parts Order Numbers 270097 and 270153).

The circuit shown in FIG. 9 represents a maximum size circuit configuration for accommodating connection to either Intel codec, 29C53 or 29C48. Less circuitry would be required for connecting only to an Intel 29C48 codec, inasmuch as that codec does not require exchange of P3 and P4 control signals indicated in this Figure and FIG. 6. When the circuits are connected to a 29C48 codec, they operate to generate P3 and P4 signals internally for transfer to the L1/L2 interface circuits.

Interrupt signal connection 181, labelled SLD_INT, carries signals distinguishing external off-hook and on-hook transitions (of a telephone set attached to the external codec). These signals extend via selection node 120 in FIG. 6 to L2 interrupt handling partition INT (43, FIG. 2). As explained earlier, these indications are relayed to the host computer system by SIO partition 23 (FIG. 2) prompting actions by the host system (via software applications running in that system) to respectively initiate and terminate signalling operations relative to telephone networks, via the subject adapter, and to set up configurations in the B channel switch (34, FIGS. 2, 3) suitable for sustaining telephone signal transfers.

Data signals representing digitized telephone audio are transferrable between the Codec (29C53 or 29C48) and internal P channel circuit paths (P/r and P/t). Signals received from the codec are forwarded to internal receive channel P/r via receiver circuit 182, and signals outbound to the codec are transferred from P/t via driver circuit 183. Associated control signals, SCL and SDIR, are exchanged with the Codec at Mux 184 and with the L1/L2 interface partition at 185.

Control signals, P3 and P4 associated with bit transfer, are furnished from one of two sources to the L1/L2 interface circuits, via multiplexor circuit 187. If the connected Codec is type 29C53, the P3 and P4 signals are received from the codec at interface 186. If the connected Codec is type 29C48, the P3 and P4 signals are generated internally by circuits 190.

The frequency of a reference 6.144 megaherz (MHz) clock signal, which is generated by a not-shown clock oscillator for the BRIM circuits, is divided by 4 at 188 to generate a 1.536 MHz reference signal for timing codec transfers. Operations of circuits 188 are synchronized further by a 4 Kiloherz signal furnished by the BRIM circuits. This synchronization serves to ensure that the incoming data rate matches the outgoing data rate at the codec interface. The 1.536 MHz signal is divided by 3 at 189 to generate a 512 KHz reference for the SCL control signals at the codec interface. A duty cycle for this clock of either 66% or 33% is suitable. The 512 KHz clock frequency is further divided by 64 to generate an 8 KHz reference for the SDIR control signals associated with individual bit transfers (50% duty cycle is suitable).

5. Example Of Telephone Application Using BSW Adaptively

The following is an example of how the B channel switch (FIG. 3) can be configured adaptively in time so that while voice telephone signals are passing in one or the other direction between ports 1 and 2B of the subject adapter, data can be transferred in the opposite direction between the host system and port 1.

This example involves an interaction between a local telephone user and a remote voice response unit (VRU), in the now familiar scenario where a remote record instructs a caller to select a sub-path for the call, e.g. by operating one of several tone keys depending upon the purpose of the call. FIG. 10 illustrates this interaction, in flow diagram form, with reference to the present invention as illustrated in FIGS. 1–9.

Figure 10A:
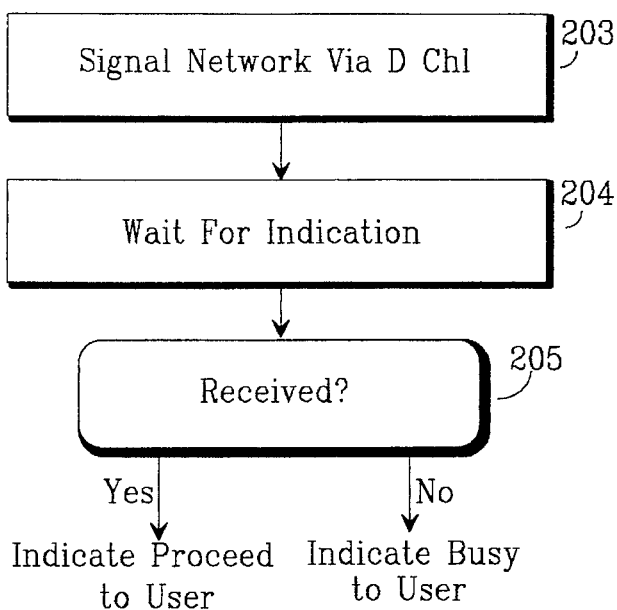
FIGS. 10A–10C illustrate details of operations shown in more general contexts in FIG. 10.
Figure 10B:
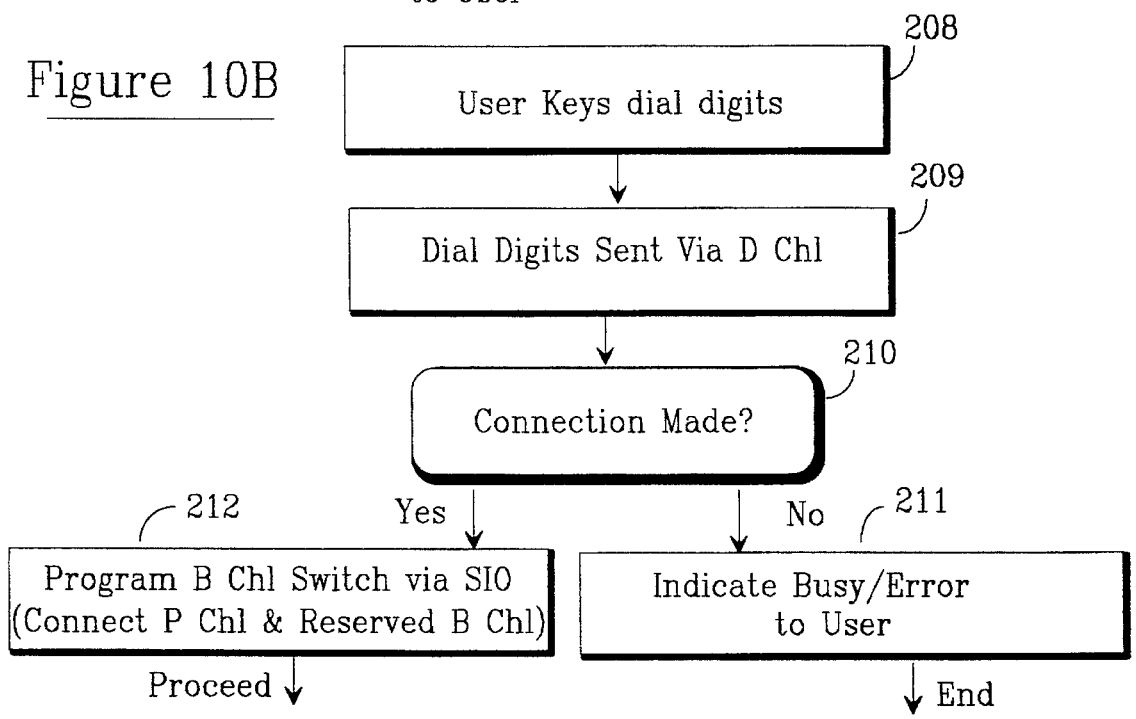
Figure 10C:
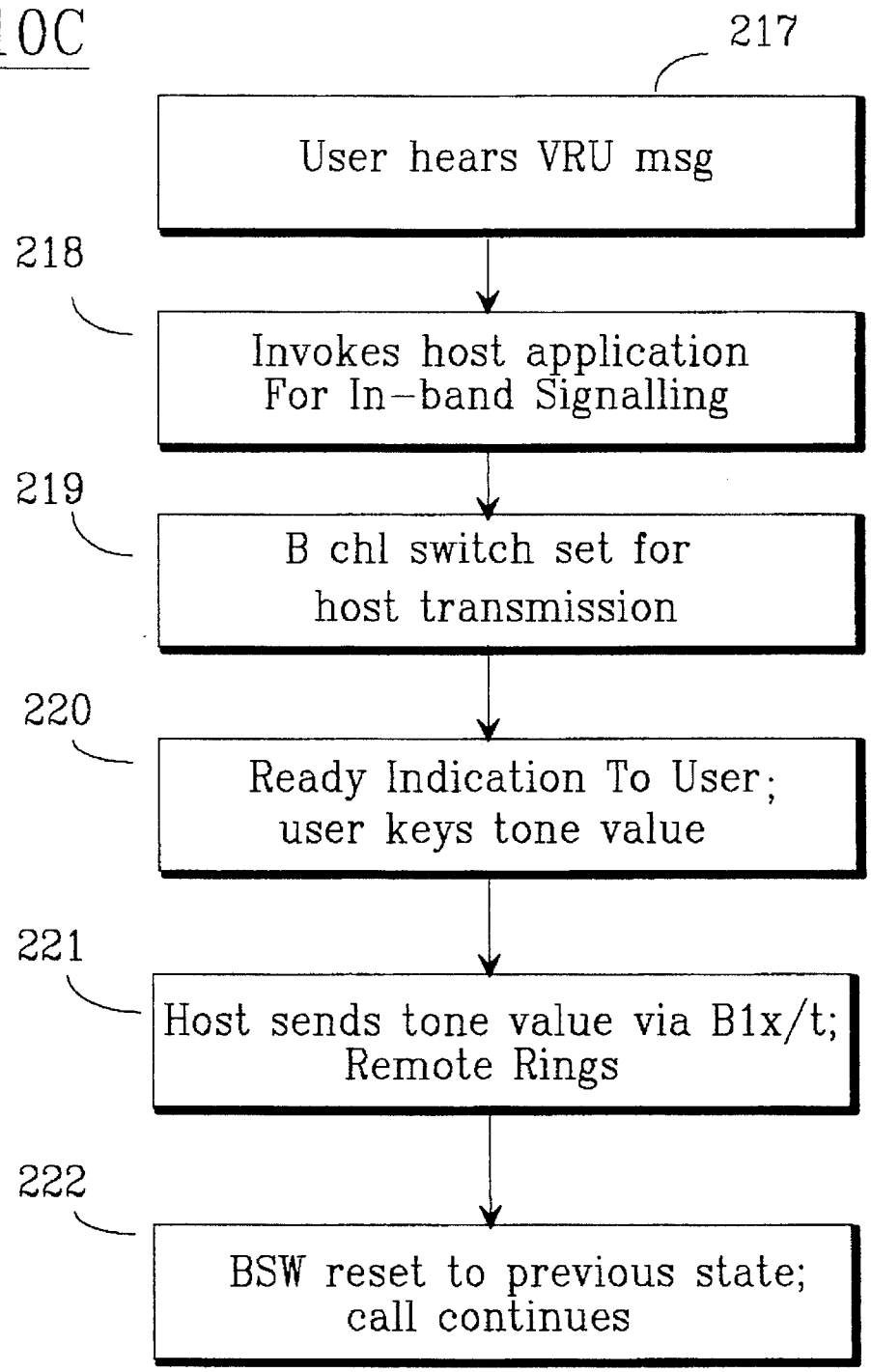

Referring to FIG. 10, and related sub-diagrams in FIGS. 10A through 10C, the calling process originates locally with an offhook interrupt 200. It is understood that the signals for this interrupt are transferred from a telephone set locally attached to port 2B, FIG. 1, to the host computer system 3, FIG. 1, via circuit elements SLD, L1/L2 interface, INT and SIO shown in FIG. 2.

The host system reacts by invoking a telephone signalling application. As suggested at 201, the latter may begin by reserving a B channel path to port 1. It is understood that if such path is unavailable, the application may be adapted to present a busy indication to the calling user (e.g. an "all lines busy" indication on the local video monitor screen of the system), and the process terminates when the user returns the phone to onhook status.

Assuming a B channel is available within a reasonable delay time, that channel is initialized for a telephone signalling process, and signals are exchanged with a remote telephone network, to establish a link connection between the local system and that network, as suggested at 202.

Referring to FIG. 10A (steps 203–205), this signal exchange is accomplished by transferring signals from the host system to e.g. central office equipment in the remote network and receiving signals from the latter indicating readiness to carry out a call connection process (i.e. signals functionally equivalent to an audible dial tone). The signals sent to the network are prepared by the host application in host memory, retrieved automatically (by the DMAC facility of) the subject adapter and transmitted through the adapter and the transmit side of the D channel at port 1 (D1/t) to the network equipment. The signals returned by the network equipment are received at the receive side of the D channel at port 1 (D1/r), by automatic operation of the subject adapter, and transferred by the latter to host system memory. Completion of the latter transfer is indicated to the host system processor by the usual completion interrupt.

If all exchange lines are busy a corresponding message is returned by the network, and an associated indication is presented by the host system to the local user (e.g. by an "all lines busy" screen indication on the local video monitor) and the process ends. If the returned message indicates readiness to proceed, the system presents the local user with an indication to proceed (206, FIG. 10A), and the process continues with the user keying in the number ("dial digits") of a remote telephone station (step 207, FIG. 10).

System operations associated with this digit keying process are suggested in FIG. 10B. Since the local telephone is assumed to be primitive (no keys or other dialing elements), the user enters each digit at a suitable local input device (e.g. keyboard) of the system (step 208, FIG. 10B), and each keyed entry is translated by the system application in into an associated message which is transmitted to the telephone network (209, FIG. 10B), via the local D1/t channel.

In normal operation, after all digits have been transmitted, office equipment in the telephone network returns a message, via D1/r, indicating one of: a) connection completed (equivalent of remote ringing tone), b) remote station busy, or c) error (call cannot be completed with combination of digits sent). These possibilities are suggested at 210, FIG. 10B.

If the returned message indicates a busy condition (or digit entry error), a corresponding busy/error indication is presented to the local user, as suggested at 211, and the process concludes. If the returned message indicates successful completion (i.e. the equivalent of an audible remote ringing tone), the host system acts to program the local B channel switch (via SIO, TSR, etc.) to form a two-way isochronal connection, through the switch, between the local P channel and the port 1 B channel reserved in step 201.

What occurs next (following step 207, FIG. 10) depends upon the state of operation of the remote station. Presently, it is assumed that the call is "answered" at the remote station either by a live person or an audible announcement from a VRU record (e. g. "if you are seeking general information, press 1, or if you need technical assistance press 2", etc.).

If the remote responder is live, the local user and remote answering party converse normally; their signals passing bidirectionally between the reserved B channel at local port 1 and the local P channel port, through the B channel switch in the subject adapter.

In this circumstance, there is no further involvement of the host system until the local user restores the local telephone set to its onhook state, and the interrupt associated with that action is received and interpreted by the host system (step 214, FIG. 10). In that event, the host system concludes its involvement by performing the operations required to end the call process as indicated at 215, FIG. 10 (i.e. operations to release the reserved port 1 B channel, reset the B channel switch, etc.).

However, if the remote response is a VRU announcement, the local user instigates further host system actions suggested at 216, FIG. 10 and in steps 217–222 in FIG. 10C.

In this circumstance, the local user hears the VRU message (217, FIG. 10C) and indicates that further system action is required (218, FIG. 10C); e.g. by operating a key on the local keyboard. This user action prompts the host system to reinvoke its telephone service application, and via the latter to perform the further operations suggested at 219–222.

In operation 219, the configuration of the B channel switch is altered (via SIO, etc.) so as to open the path from the local P/r channel to the transmit side of the reserved B channel, thereby clearing a path from system memory to the transmit side of the B channel. The system indicates completion of this action to the local user, and the latter then operates a key representing a selection responsive to the VRU announcement (220, FIG. 10C).

The local system translates this key operation into a message stored in local system memory, and prompts the subject adapter too transmit that message to the telephone network through the transmit side of the reserved B channel (221, FIG. 10C). Transmission of this message is termed "inband" (216, FIG. 10) to distinguish such from other control signalling actions performed via the D channel facility.

Equipment in the telephone network (either at the remote called station or in an intermediate office exchange) intercepts the inband message and effects a further remote connection operation defined by that message. This can be accomplished (in either a local exchange at the remote station or an intermediate office) by equipment providing ISDN "R" interface adaptor functions which convert the message to an analog equivalent audible tone for use by non-ISDN equipment associated with the remote VRU (221, FIG. 10C).

Immediately after sending the message representing the selection response to the VRU message, the local host reprograms the B channel switch, to reestablish the outbound path from P/r to the transmit side of the reserved B channel and the process continues (222, FIG. 10C).

Of course, if the selection results in another VRU audible announcement, giving further selection instructions, the process 217–222 can be re-instigated by the local user.

6. Other Potential Applications

A "voice mail" application of the subject invention is suggested in FIG. 11. Other potential applications (call forwarding, call waiting, etc.) will be apparent to those skilled in the relevant arts. FIG. 11 suggests a "localized" voice mail application, wherein the local host system and its memory are used to record messages of remote callers.

Remote call origination (message received from telephone network via D channel at adapter port 1) is detected by the local host (240, FIG. 11), and an alerting indication is given to the local user (e.g. by generation of an audible "beep" tone in the computer system). If a user responds (local phone goes offhook and related interrupt detected by system), the system reserves a port 1 B channel and configures the local B channel switch as for a locally originated call (242, FIG. 11), and does not have further involvement in the call process until the process ends with return of the phone to onhook status (243, FIG. 11); at which time the local system performs the usual releases the B channel and resets the switch configuration as before (244, FIG. 11).

If the remote call signal is not answered, and an application providing voice recording service is locally available (245, FIG. 11), the local system reserves a port 1 B channel and sends an audible pre-recorded announcement (from host memory in digital form) to the remote caller (246, FIG. 11). The remote caller may then respond with a voice message, transferred through the network and the subject adapter to host memory, in digital form (246, FIG. 11) completing the call handling process.

Subsequently, in a manner not shown in the figure, the local user is alerted to the existence of a recorded message and presented with the message in audible form. One means of accomplishing this latter service would be to present an alerting indication to the local user on the local video monitor screen (e.g. "message waiting"), and allow the user to invoke an application for delivering the recorded message in a locally audible form. The last action can be accomplished either by transferring the record through the subject adapter and the external codec to the receiver of the local telephone, or by converting the record to analog form elsewhere in the system and transfer of the associated analog signals to the internal speaker of the system.

In similar fashion, other telephone services usually provided at additional cost by public networks can be implemented locally in the host system.

Take, for example, call forwarding services. It should be apparent that the local system could be adapted by a suitable application to forward calls to other computer stations in accordance with instructions entered into the system by a local user. The forwarding application could, for example, operate through a second B channel (at port 1 or 2A) to establish connection to a forwarding telephone station, and then configure the B channel switch of the local adapter to route signals directly between a (first) B channel handling an incoming call and the second B channel; so as to effectively connect a remote calling telephone with the forwarding station.

As another example, consider call waiting service. While a call is in progress locally, through the subject adapter and B channel switch, it would be simple to alert the local system that another call is incoming (e.g. via a message transferred to system memory through the receive side of the port 1 D channel of the subject adapter) and equally simple to alert the local user to that condition (e.g. "beep" on local system speaker).

Other possible applications should readily occur to those skilled in the relevant arts.

We claim:

1. A data communication adapter for use with a computer system at a single subscriber's premise for interfacing between said computer system and a digital signal communication network, said network having plural lines, each line providing plural channels for data communication including at least two B channels and at least one D channel, each said B channel supporting transmission of digital signals representing computer data and digitized voice signals, said adapter at said subscriber's premises comprising:

a local telephone port;

connection means for connecting a telephone handset to said local telephone port; said connection means comprising means for translating electrical signals respectively received at said local telephone port and a said handset into signals respectively suitable for audible reproduction at said handset and transmission on said network;

two network connection ports, said ports serving to connect said adapter to two separate ones of said plural lines; said two separate lines together providing at least four separate B channels and at least two separate D channels for communication;

a time division switch circuit coupled to said computer system, said two network connection ports, and said local telephone port; said switch circuit providing time division connections:

(1) between said two network connection ports for routing digital signals directly between one of said two B (channels on one of said two separate communication lines and either (i) one of said two B channels on said other of said two separate communication lines or (ii) said other of said two B channels on said one of said two separate lines without intervening handling of respective signals in said computer system;

(2) between said local telephone port and one of said network connection ports for routing digitized voice signals between one of said two B channels on one of said two separate communication lines and said local telephone port without intervening handling of respective signals in said computer system;

(3) between said two network connection ports, said computer system and said local telephone port for routing signals between (a) one of said two B channels on one of said two separate communication lines and said computer system in one direction and while concurrently routing signals in a direction opposite to said one direction between said one B channel on said one separate communication line and either (i) one of said two B channels on said other of said two separate communication lines, (ii) said other of said two B channels on said one of said two separate lines or (iii) said local telephone port and (4) between said two network connection ports and said computer system for routing digital signals between said two network connection ports and said computer system.

2. A data communication adapter in accordance with claim 1 wherein:

said switch circuit is programmable by said computer system to provide various sub-combinations of said time varying connections.

3. A data communication adapter in accordance with claim 1 wherein:

said switch circuit is dynamically programmable to different states by said computer system, while a connection exists via a said channel on one of said two network lines between said local telephone port and a remote station of said network, for routing signals at different times, over said existing connection, between said local telephone port and said remote station and between said computer system and said remote station; whereby signals representing audible speech can be routed between a telephone set connected to said local telephone port and said remote station, while intermittently other signals representing digital data are routed between said computer system and said remote station.

4. A data communication adapter in accordance with claim 1 wherein:

said switch circuit is selectively programmable by said computer system for routing signals in one direction, between said computer system and one of said two B channels on one of said two network lines, while concurrently routing signals in a direction opposite to said one direction, between a selected one of said two B channels and one D channel, on said one of said two network lines, and said local telephone port.

5. A data communication adapter in accordance with claim 1 wherein said switch circuit is dynamically programmable by said computer system for routing signals representing information directly and isochronally between said two network lines without handling of the respective signals between said switch circuit and said computer system and without delays that would be caused by said handling.

6. A data communication adapter in accordance with claim 1 wherein said switch circuit is programmable by said computer system for selectively routing signals representing audible sound functions between either of said two network lines and said computer system, and between one of said two network lines and said local telephone port; whereby said computer system may be used as a voice mail repository, for telephone calls routed through through either one of said network lines while a said handset at said local telephone port is unattended, and telephone calls may be actively supported between said network and said handset when said handset is attended.

7. A data communication adapter in accordance with claim 1 wherein said adapter comprises transmit and receive circuit partitions for respectively forwarding signals from said computer system to said switch circuit and from said switch circuit to said computer system; and wherein said switch circuit interfaces between said partitions, said two communication ports extending to said two network lines, and said local telephone port, for selectively routing signals between said computer system and said communication ports and between selected pairs of said communication and local telephone ports directly.

8. A data communication adapter in accordance with claim 7 wherein said switch circuit includes:

a receive circuit section connected to receive signals selectively from said channels on said two network lines, via respective ones of said two communication ports and from a said handset via said local telephone port;

a transmit circuit section connected to transmit signals selectively to said channels on said two network lines, via said respective ones of said communication ports, and to a said handset via said local telephone port;

plural registers connected between said receive and transmit circuit sections;

means connecting said receive circuit section to said registers and said receive partition of said adapter; said receive circuit section including means for selectively forwarding signals received in said receive circuit section to said registers and to said receive partition of said adapter for routing to said computer system; and means coupling said transmit circuit section to receive signals selectively from said registers and from said computer system via said transmit partition of said adapter; said transmit circuit section including means for selectively forwarding signals from either said registers or said transmit partition to said two communication ports and said local telephone port.

9. A data communication adapter in accordance with claim 8 comprising:

layer 1 signal handling circuit means interfacing between said switch circuit means and said communication port for isolating said switch circuit and said receive and transmit partitions from said two network lines, and for synchronizing communications relative to said channels provided by said two network lines at respective ones of said communication ports.

10. A data communication adapter in accordance with claim 8 wherein said receive and transmit partitions each contain OSI/ISO processing circuits, for performing layer 2 data processing functions on signals conveyed through respective partitions in timed coordination with communication processes on either or both of said two network lines, and wherein said adapter comprises:

asynchronous signal handling circuit means interfacing between said computer system and both said receive and transmit partitions for handling signals between said computer system and said partitions in asynchronous relation to associated signal transfer processes occurring in said two network lines, and for isolating said computer system thereby from timing coordination requirements of said network.

11. A data communication adapter in accordance with claim 8 wherein said plural registers includes:

first, second, third and fourth registers wherein said first register holds data for one of said two B channels of one of said two separate communication lines, said second register holds data for said other of said two B channels on said one of said two separate lines, said third register exclusively holds data for either (a) one of said two B channels of said other of said two separate communication lines or (b) said local telephone port and said fourth register holds data for said other of said two B channels on said other of said two separate lines.

\* \* \* \* \*